United States Patent
Tanaka et al.

(10) Patent No.: US 9,525,820 B2
(45) Date of Patent: Dec. 20, 2016

(54) SHAKE AMOUNT DETECTION DEVICE AND IMAGING DEVICE

(71) Applicant: OLYMPUS CORPORATION, Hachioji-shi, Tokyo (JP)

(72) Inventors: Kiyoshi Tanaka, Hachioji (JP); Hitoshi Tsuchiya, Hamura (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/837,357

(22) Filed: Aug. 27, 2015

(65) Prior Publication Data

US 2015/0365598 A1 Dec. 17, 2015

Related U.S. Application Data

(63) Continuation of application No. PCT/JP2014/053656, filed on Feb. 17, 2014.

(30) Foreign Application Priority Data

Feb. 28, 2013 (JP) .................................. 2013-039551

(51) Int. Cl.
*H04N 5/228* (2006.01)
*H04N 5/232* (2006.01)

(52) U.S. Cl.
CPC ........ *H04N 5/23258* (2013.01); *H04N 5/2328* (2013.01); *G03B 2217/005* (2013.01)

(58) Field of Classification Search
CPC .............. H04N 5/23258; H04N 5/2328; G03B 2217/002
USPC ...................................................... 348/208.2
See application file for complete search history.

(56) References Cited

U.S. PATENT DOCUMENTS

| | | | |
|---|---|---|---|
| 5,740,471 | A | 4/1998 | Terui |
| 2007/0201848 | A1 | 8/2007 | Taguchi |
| 2008/0145041 | A1 | 6/2008 | Enomoto |
| 2010/0013937 | A1 | 1/2010 | Washisu |
| 2011/0164864 | A1 | 7/2011 | Taguchi |

(Continued)

FOREIGN PATENT DOCUMENTS

| | | |
|---|---|---|
| EP | 1819149 A1 | 8/2007 |
| EP | 1819150 A1 | 8/2007 |

(Continued)

OTHER PUBLICATIONS

International Search Report mailed in corresponding International Patent Application No. PCT/JP2014/053656 on May 20, 2014, consisting of 5 pp. (English translation provided).

(Continued)

*Primary Examiner* — Usman Khan
(74) *Attorney, Agent, or Firm* — Volpe and Koenig, P.C.

(57) ABSTRACT

A shake amount detection device includes an acceleration sensor. A vibration period detector detects a vibration period during which vibration that becomes a predetermined acceleration is applied to a body. A velocity variation estimation unit estimates a first movement velocity which is a component velocity due to an attitude movement of the body during the vibration period. A velocity calculator calculates a second movement velocity that is a velocity of the body and corrects the second movement velocity in a case of the vibration period as a detection result of the vibration period detector. A shake amount calculator calculates an image blur correction amount relative to the vibration applied to the body, based on the second movement velocity corrected by the velocity calculator.

12 Claims, 19 Drawing Sheets

(56) References Cited

U.S. PATENT DOCUMENTS

2012/0169891 A1   7/2012   Washisu

FOREIGN PATENT DOCUMENTS

| JP | H7-225405 A | 8/1995 |
| JP | 2897413 B2 | 3/1999 |
| JP | 2007-218976 A | 8/2007 |
| JP | 2008-151822 A | 7/2008 |
| JP | 2010-025962 A | 2/2010 |
| JP | 2011-059429 A | 3/2011 |

OTHER PUBLICATIONS

International Preliminary Report on Patentability issued in corresponding International Patent Application No. PCT/JP2014/053656 on Sep. 1, 2015, consisting of 9 pp.
Search Report issued in corresponding European Patent Application No. 14757437 on Jul. 25, 2016, consisting of 9 pp.

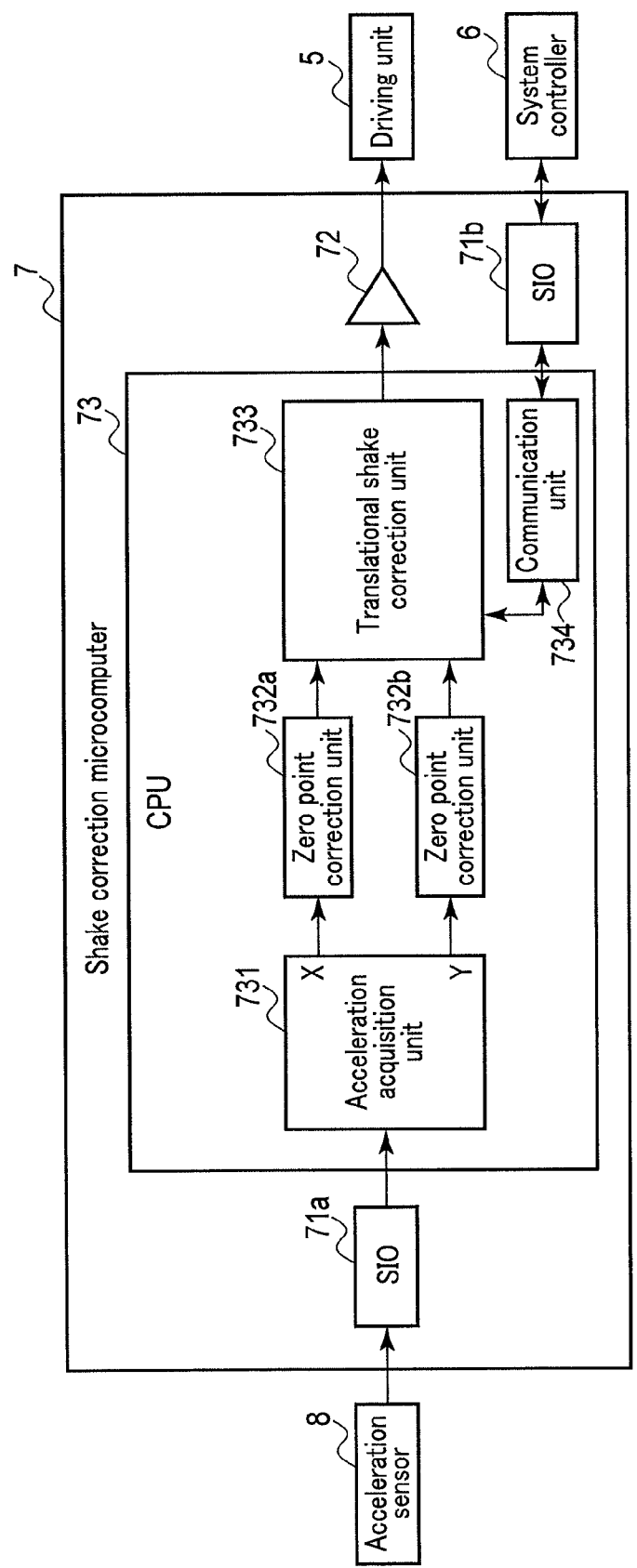
F I G. 3

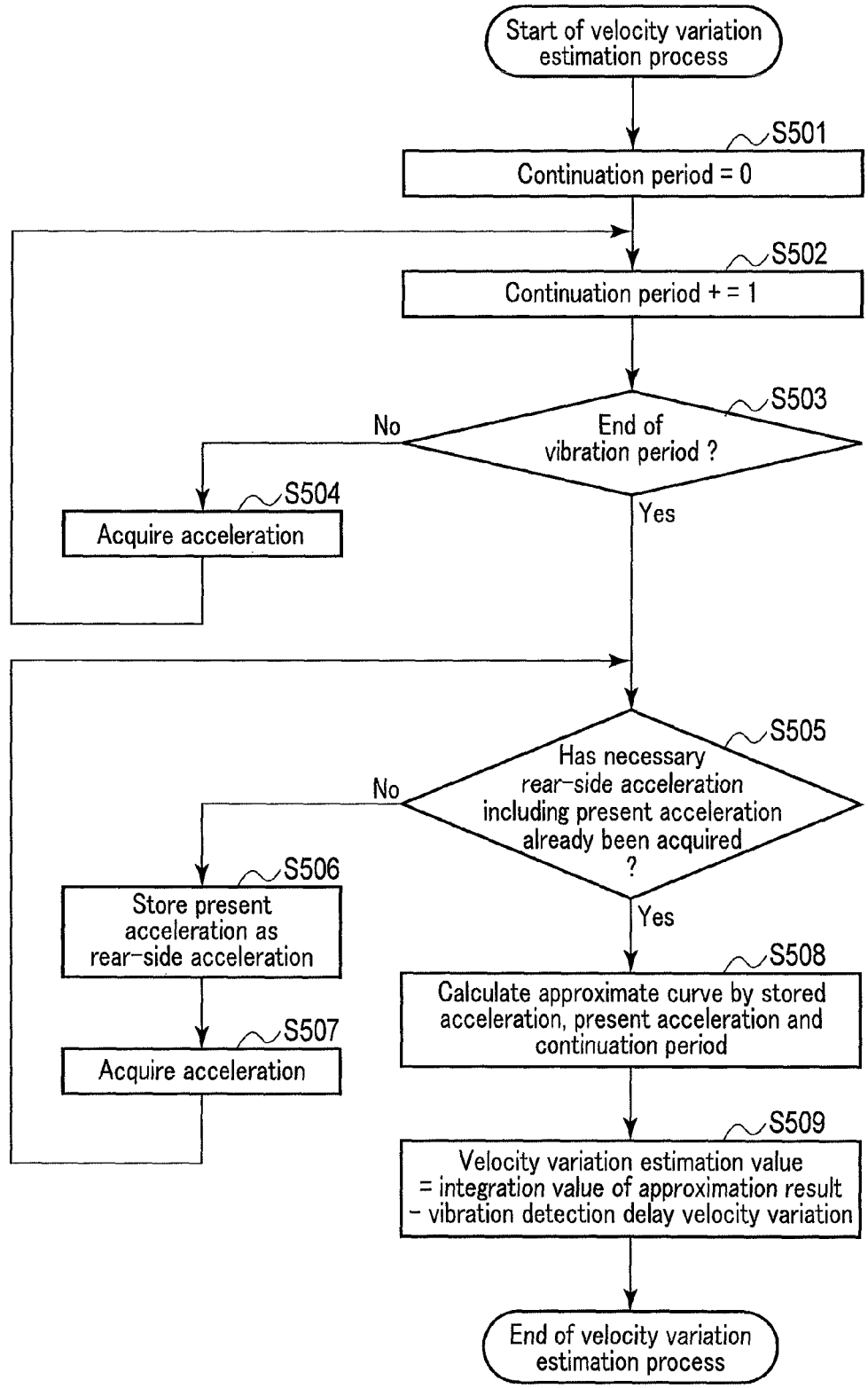
F I G. 18

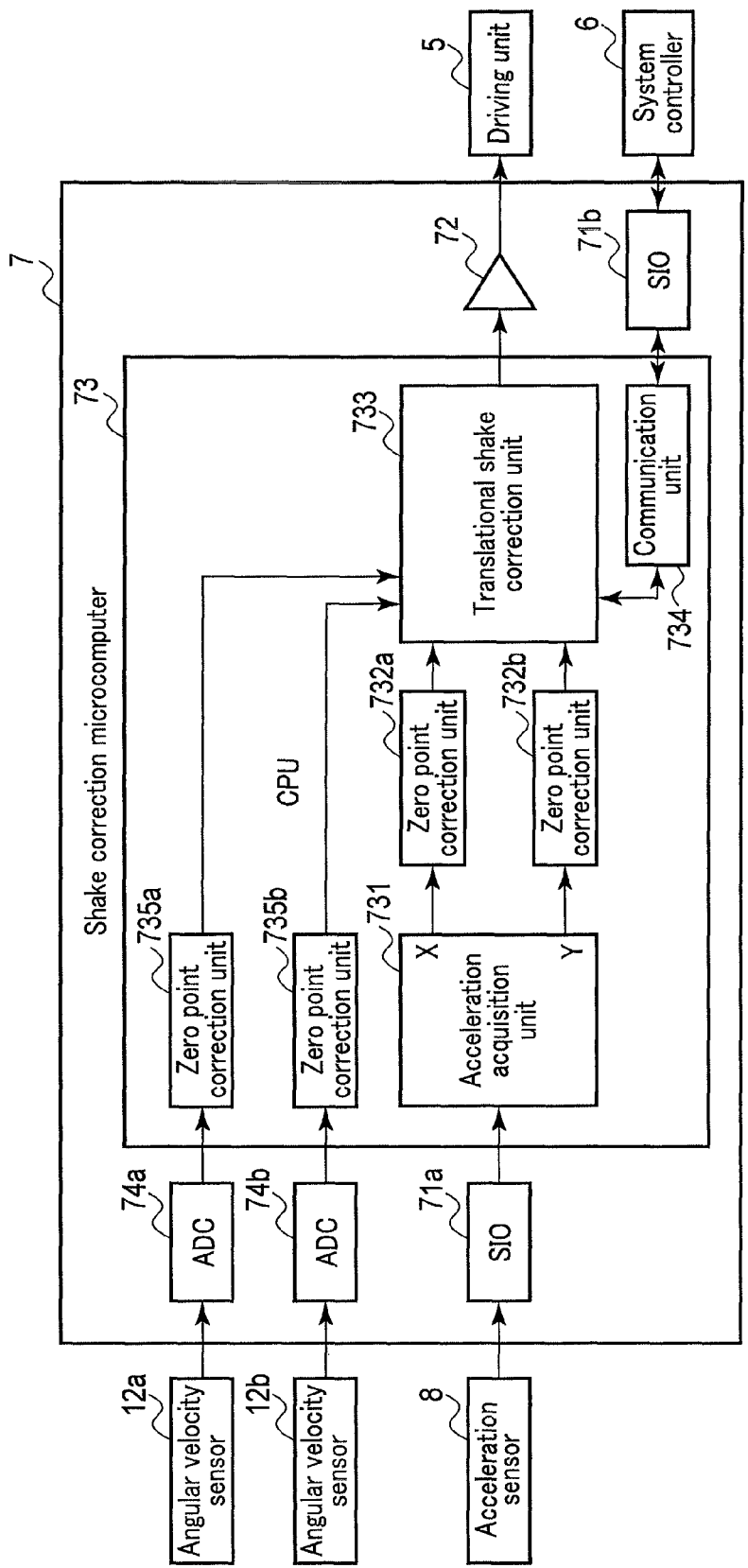
F I G. 21

SHAKE AMOUNT DETECTION DEVICE AND IMAGING DEVICE

CROSS-REFERENCE TO RELATED APPLICATIONS

This application is a Continuation application of PCT Application No. PCT/JP2014/053656, filed Feb. 17, 2014 and based upon and claiming the benefit of priority from the prior Japanese Patent Application No. 2013-039551, filed Feb. 28, 2013, the entire contents of both of which are incorporated herein by reference.

BACKGROUND OF THE INVENTION

1. Field of the Invention

The present invention relates to a shake amount detection device, and an imaging device including the same.

2. Description of the Related Art

In recent years, imaging devices with camera shake correction functions have been gaining in popularity. With such an imaging device, a user can take a good image which is free from image blur due to a camera shake, without paying particular attention.

In general, a camera shake increases at a time of photographing with a long exposure time. In some cases, an image blur at a time of such long-exposure photography fails to be sufficiently corrected. In particular, when long-exposure photography in a macro-region is conducted, it is highly possible that an image blur cannot fully be corrected. The reason for this is that, in many cases, a translational shake cannot fully be corrected by conventional camera shake correction. Camera shakes can generally be classified into an angular shake and a translational shake. The angular shake is such a camera shake that the angle of the optical axis of the imaging device is varied. On the other hand, the translational shake is such a camera shake that the body of the imaging device is moved in a planar direction perpendicular to the optical axis. When the image magnification is small, the effect of image blur due to a translational shake is small. If the image magnification increases, the effect of image blur due to the translational shake becomes greater. Accordingly, in a macro-region in which the image magnification is large in general, the effect of image blur due to the translational shake increases, and sufficient image blur correction cannot be made. Consequently, the quality of images deteriorates.

Jpn. Pat. Appin. KOKAI Publication No. H7-225405 proposes a method of detecting a translational shake. An imaging device, which is proposed in this Jpn. Pat. Appin. KOKAI Publication No. H7-225405, includes an acceleration detection device configured to detect accelerations in directions of three axes acting on the imaging device; an angular velocity detection device configured to detect angular velocities about these three axes; attitude detection means for calculating a coordinate transformation matrix between a camera coordinate system and a coordinate system at rest, from the accelerations in the three-axis directions and the angular velocities about the three axis; and gravitational acceleration component calculation means for calculating, from the coordinate matrix, a gravitational acceleration velocity component in the camera coordinate system. The gravitational acceleration component is eliminated from the output of the acceleration detection device, and then a translational movement amount is calculated. Based on the calculated translational movement amount, image blur correction is made.

In addition, in the case of an imaging device including a movable component such as a shutter or an instant return mirror, vibration occurring due to the operation of the movable component may affect image blur correction. Japanese Patent No. 2897413 proposes a method in which, when vibration has occurred due to the operation of the movable component, the effect of the vibration in the calculation of shake information is reduced by prohibiting the calculation of shake information for a predetermined period until the output of an angular velocity sensor is stabilized.

BRIEF SUMMARY OF THE INVENTION

According to an aspect of the invention, a shake amount detection device comprises: an acceleration sensor configured to detect an acceleration which is applied to a body; a vibration period detector configured to detect a vibration period during which vibration of a predetermined threshold or more is applied to the body; a velocity variation estimation unit configured to estimate a velocity variation of the body during the vibration period, based on the acceleration detected by the acceleration sensor; a velocity calculator configured to calculate a velocity of the body, based on the acceleration, and to correct the velocity, based on the velocity variation estimated by the velocity variation estimation unit; and a shake amount calculator configured to calculate an image blur correction amount relative to the vibration applied to the body, based on the velocity corrected by the velocity calculator. Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram illustrating an internal configuration of a shake correction microcomputer according to the first embodiment.

FIG. 18 is a flowchart illustrating a velocity variation estimation process in Modification 4.

FIG. 21 is a block diagram illustrating an internal configuration of a shake correction microcomputer according to a fourth first embodiment.

DETAILED DESCRIPTION OF THE INVENTION

Embodiments of the present invention will be described hereinafter with reference to the accompanying drawings.

Figure 1:
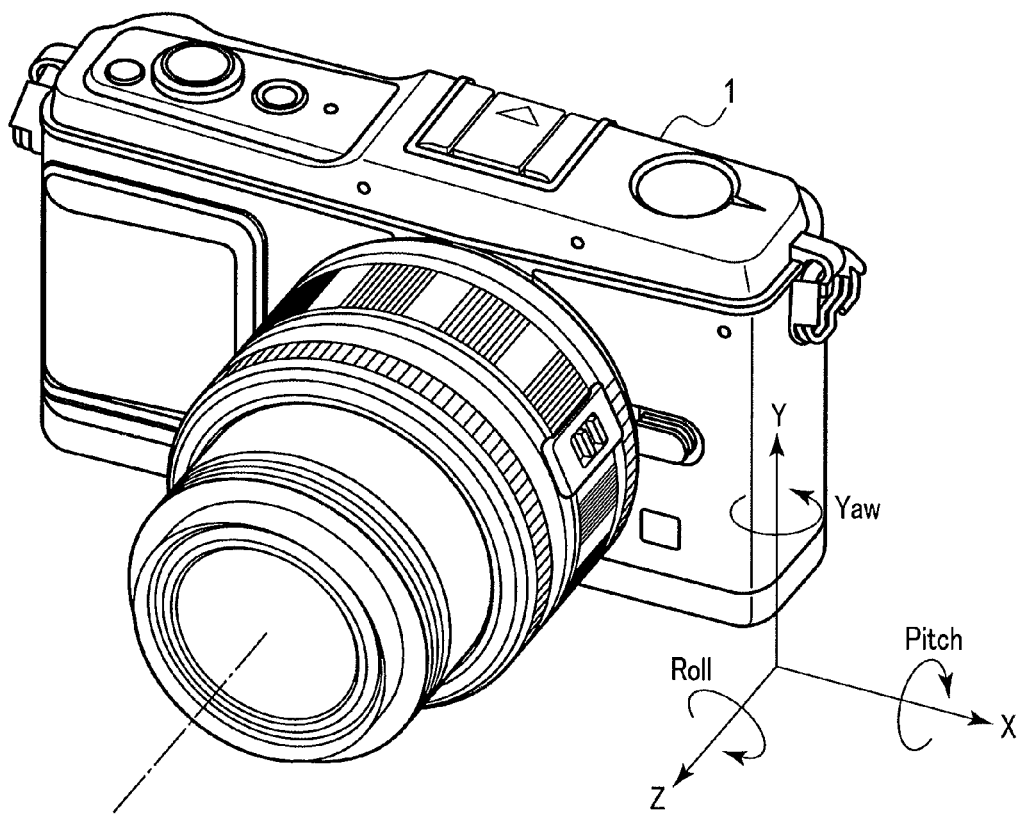
FIG. 1 is an external appearance view of the body of a camera functioning as an imaging device according to each of embodiments.

Before describing the embodiments of the present invention, movements occurring in the body of an imaging device are defined. FIG. 1 is an external appearance view of the body of a camera functioning as an imaging device including a shake amount detection device according to each of the embodiments of the invention.

As illustrated in FIG. 1, orthogonal three axes are defined for a body 1 of the camera. An axis of the body 1, which becomes a left-and-right direction when a user holds the body 1 of the camera in a horizontal position, is defined as an X axis. The right direction of the X axis is a + direction, and the left direction of the X axis is a − direction. In addition, an axis of the body 1, which becomes an up-and-down direction when the user holds the body 1 of the camera in the horizontal position, is defined as a Y axis. The upward direction of the Y axis is a + direction, and the downward direction of the Y axis is a − direction. Besides, an axis along the optical axis of the camera, which is indicated by a dot-and-dash line in FIG. 1, is defined as a Z axis. A subject side (front side of the body 1) of the Z axis is a + direction, and an image side (rear side of the body 1) of the Z axis is a − direction. The X axis and Y axis illustrated in FIG. 1 correspond to an X axis and a Y axis of an imaging plane of an image-capturing element 4 which is to be described later.

Additionally, as illustrated in FIG. 1, a rotational direction about the X axis is defined as a pitch direction, a rotational direction about the Y axis is defined as a yaw direction, and a rotational direction about the Z axis is defined as a roll direction. As regards the positive/negative of the rotational directions, the direction of each arrow in FIG. 1 is a + direction, and the opposite direction is a − direction.

The positive/negative of the above-described directions depends on the direction of mounting of an acceleration sensor 8 (to be described later). In some cases, depending on the direction of mounting of the acceleration sensor 8, the positive/negative of directions may be different from that illustrated in FIG. 1.

Figure 2:
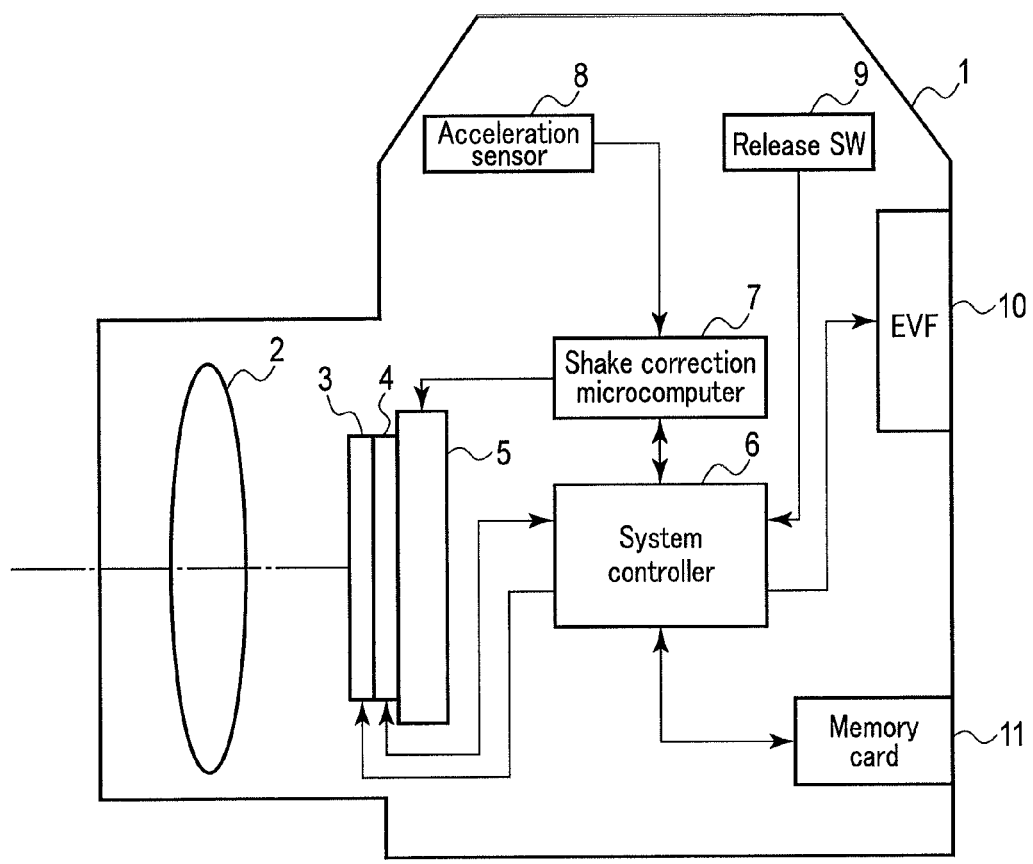
FIG. 2 is a block diagram illustrating a configuration of the entirety of the camera according to each embodiment.

FIG. 2 is a block diagram illustrating a configuration of the entirety of the camera according to each embodiment of the invention. In the body 1 of the camera according to the embodiments, there are provided an optical system 2, a focal plane shutter 3, an image-capturing element 4, a driving unit 5, a system controller 6, a shake correction microcomputer 7, an acceleration sensor 8, a release (switch) SW 9, and an electronic view finder (EVF) 10. In addition, a memory card 11 is provided within the body 1, or is attachable in the body 1.

The optical system 2 includes a single or a plurality of lenses and an aperture. The optical system 2 forms an image of a light flux from the outside of the body 1 on the imaging plane of the image-capturing element 4 as a subject image. The focal plane shutter 3 is provided in front of the imaging plane of the image-capturing element 4, and is operated to open/close, thereby setting the image-capturing element 4 in an exposed state or in a light-shielded state. The image-capturing element 4 converts the subject image, which is formed on the imaging plane, to an electric signal, based on an instruction from the system controller 6.

The driving unit 5 includes a support member which supports the image-capturing element 4. Based on an instruction from the shake correction microcomputer 7, the driving unit 5 drives the image-capturing element 4 in the X-axis direction and Y-axis direction.

The system controller 6 executes various controls relating to the functions of the entirety of the camera, aside from the above-described read-out of video signals.

For example, the system controller 6 reads out a video signal from the image-capturing element 4, and executes an image process for converting the read-out video signal to a format that is suited to display or recording. In addition, the system controller 6 controls a photography operation when a second release SW of the release SW 9, which will be illustrated later, is turned on. The photography operation is a series of operations from driving the image-capturing element 4, to acquiring a video signal, to processing this video signal in a format suited to recording, and to recording the video signal in the memory card 11. In addition, at the time of the photography operation, the system controller 6 executes control relating to exposure of the image-capturing element 4, based on an external light flux which is incident through the optical system 2. For example, the system controller 6 controls an opening time of the focal plane shutter 3 and an aperture value of the optical system 2. Furthermore, the system controller 6 monitors the image magnification of the optical system 2. For example, when the optical system 2 includes a zoom lens, the system controller 6 monitors the image magnification by the position of the zoom lens (the position corresponding to the focal distance). Besides, the system controller 6 monitors the image magnification, also by monitoring whether a position corresponding to the focus (a subject distance at a time of focusing) of the lens, which constitutes the optical system 2, has become coincident with a macro-position (a position corresponding to close proximity photography).

In addition, the system controller 6 executes control of image blur correction by communication with the shake correction microcomputer 7. The shake correction microcomputer 7 controls an image blur correction operation in accordance with the control of the system controller 6. The shake correction microcomputer 7 calculates an image blur correction amount from the output of the acceleration sensor 8, and inputs the calculated image blur correction amount to the driving unit 5. In accordance with this image blur correction amount, the driving unit 5 drives the image-capturing element 4, and thereby an image blur, which is a blur on the imaging plane of the image-capturing element 4, can be prevented. This shake correction microcomputer 7 will be described later in detail.

The acceleration sensor 8 detects accelerations along the X axis and Y axis illustrated in FIG. 1. A signal of the acceleration detected by the acceleration sensor is input to the shake correction microcomputer 7.

The release switch (SW) 9 is a switch which operates in response to a release button provided on the body 1. The release SW 9 includes a first release SW which is turned on in response to a half-press of the release button, and a second release SW which is turned on in response to a full-press of the release button.

The electronic view finder (EVF) 10 is, for instance, a liquid crystal panel, and displays video based on the video signal, which is converted to a displayable format by the system controller 6, so that the user can visually recognize the video.

The memory card 11 is, for instance, a flash memory, and records the video signal, which is converted to a recordable format by the system controller 6.

First Embodiment

Hereinafter, embodiments of the present invention will be described. FIG. 3 is a block diagram illustrating an internal configuration of the shake correction microcomputer 7 according to a first embodiment of the present invention. The shake correction microcomputer 7 includes an SIO 71a, a SIO 71b, a driver 72, and a CPU 73. Here, FIG. 3 illustrates only a configuration for correcting a translational shake. This aims at making the description simpler. Needless to say, a configuration for correcting an angular shake may further be provided.

The SIO 71a and SIO 71b are communication units for the CPU 73 to execute serial communication with other devices. The SIO 71a is used for communication with the acceleration sensor 8. In addition, the SIO 71b is used for communication with the system controller 6.

The driver 72 generates a signal for driving the driving unit 5, based on an image blur correction amount calculated by the CPU 73, and inputs the generated signal to the driving unit 5.

The CPU 73 calculates an image blur correction amount for correcting a translational shake of the body 1, from the detection result of the acceleration sensor 8, and inputs the calculated image blur correction amount to the driver 72. The CPU 73 includes an acceleration acquisition unit 731, zero point correction units 732a and 732b, a translational shake correction unit 733, and a communication unit 734.

The acceleration acquisition unit 731 reads out a value of two-axis acceleration from the acceleration sensor 8 via the SIO 71a. Then, the acceleration acquisition unit 731 divides the read-out value of the acceleration into values of the X axis and Y axis, and inputs them to the translational shake correction unit 733.

The zero point correction units 732a and 732b subtract, from the acceleration signals acquired by the acceleration acquisition unit 731, acceleration signal levels (zero points) which are acquired when the acceleration of the body 1 becomes zero, thereby eliminating offset components of the acceleration signals acquired by the acceleration acquisition unit 731, and matching the zero points of the acceleration with predetermined reference values. Here, the zero point correction unit 732a corrects the zero point of the X-axis acceleration. The zero point correction, unit 732b corrects the zero point of the Y-axis acceleration.

Based on the accelerations of the X axis and Y axis which are input from the zero point correction units 732a and 732b, the translational shake correction unit 733 calculates an image blur correction amount for correcting the translational shake of the body 1. The detailed configuration of the translational shake correction unit 733 will be described later.

The communication unit 734 communicates with the system controller 6 via the SIO 71b.

Figure 4:
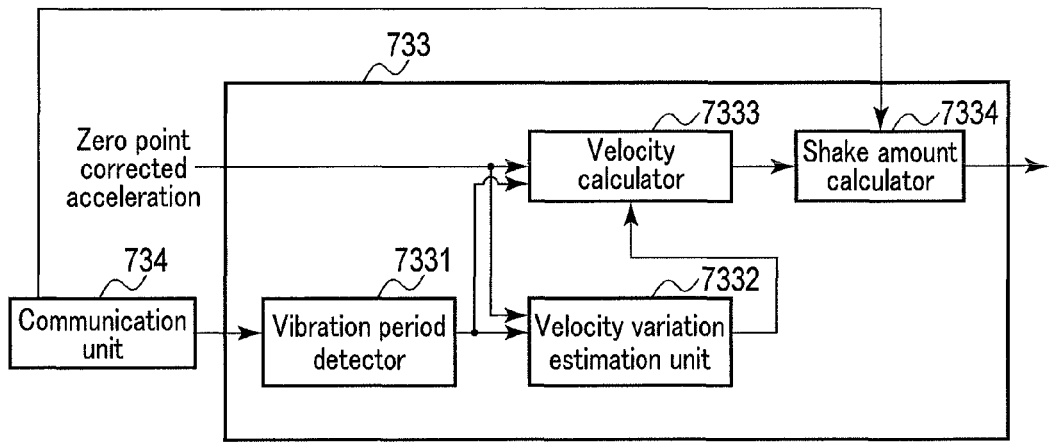
FIG. 4 is a view illustrating a schematic configuration of a translational shake correction unit.
Figure 5:
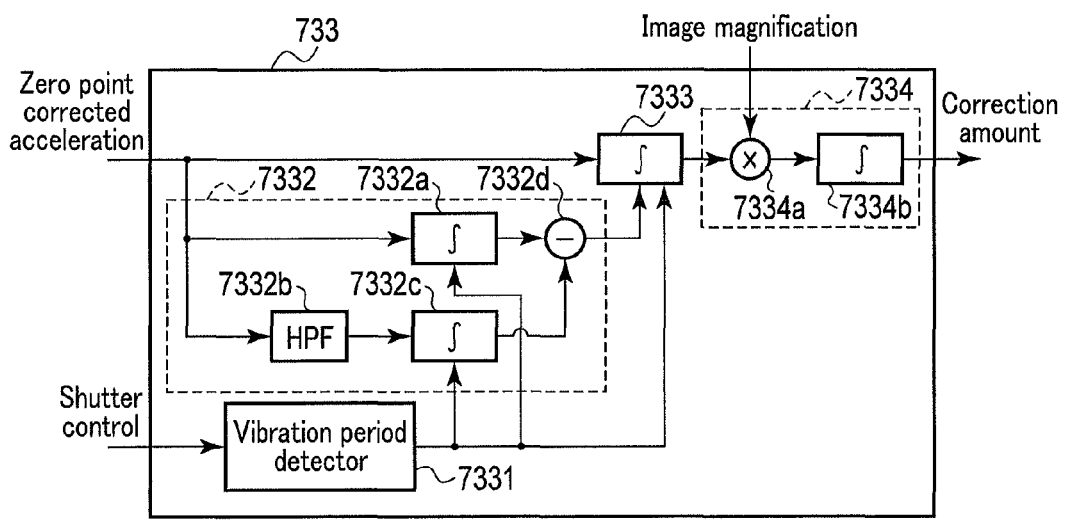
FIG. 5 is a view illustrating a detailed configuration of the translational shake correction unit in the first embodiment.

FIG. 4 is a view illustrating a schematic configuration of the translational shake correction unit 733. FIG. 5 is a view illustrating a detailed configuration of the translational shake correction unit 733 in the first embodiment. Here, as regards the translational shake correction unit 733 of FIG. 4 and FIG. 5, FIG. 4 and FIG. 5 illustrate the configuration relating to one axis. Actually, the translational shake correction unit 733 of FIG. 4 and FIG. 5 exits for each of the two axes, namely the X axis and Y axis.

The translational shake correction unit 733 includes a vibration period detector 7331, a velocity variation estimation unit 7332, a velocity calculator 7333, and a shake amount calculator 7334.

The vibration period detector 7331 detects a vibration period by communication with the system controller 6 via the communication unit 734. The vibration period is a period during which vibration of a predetermined threshold or more is applied. This predetermined threshold is vibration which is greater than vibration due to a camera shake, and is, for example, vibration due to the operation of a movable component such as the focal plane shutter 3. The vibration period detector 7331 detects the vibration period, for example, in accordance with a shutter control signal which is input from the system controller 6. Besides, the vibration period may be experimentally measured.

The velocity variation estimation unit 7332 estimates a velocity variation of the body 1 during the vibration period, based on the value of the zero point corrected acceleration which is input from the zero point correction unit 732a, 732b. The velocity variation estimation unit 7332 includes an integration unit 7332a, a high-pass filter (HPF) 7332b, an integration unit 7332c, and a subtracter 7332d.

The integration unit 7332a calculates the velocity by integrating the zero point corrected acceleration during the vibration period. This integration unit 7332a executes integration only during the vibration period, and continues to output "0" during the other periods. Here, the velocity, which is calculated by the integration unit 7332a, includes a velocity due to the vibration (camera shake) of the body 1 itself, and a velocity based on the vibration due to the operation of the movable component such as the focal plane shutter 3.

The HPF 332b eliminates a predetermined low-frequency component in the zero point corrected acceleration during the vibration period. Here, it is assumed that a cutoff frequency of the HPF 7332b is, for example, 20 Hz. It is experimentally understood that the frequency of vibration due to the camera shake is in a range of about 1 Hz to 10 Hz, and the frequency of vibration due to the operation of the movable component such as the focal plane shutter 3 is about 50 Hz. Accordingly, by eliminating a frequency component of 20 Hz or less, which is sufficiently higher than the frequency of vibration due to the camera shake, it is possible to extract only the acceleration component due to the operation of the movable component. Incidentally, it should suffice if the frequency component, which is eliminated by the HPF 7332b, is higher than the upper-limit frequency of vibration due to the camera shake and is lower than the lower-limit frequency of vibration due to the operation of the movable component. Here, although the cutoff frequency is assumed to be 20 Hz by way of example, it is better, in fact, to set the cutoff frequency by also taking into account the influence of the phase.

The integration unit 7332c calculates the velocity by integrating the acceleration due to only the operation of the movable component which is input from the HPF 7332b. The integration unit 7332c executes integration only during the vibration period, and continues to output "0" during the other periods. Here, the velocity, which is calculated by the integration unit 7332c, corresponds to a velocity offset which is erroneously calculated by the integration unit 7332a due to vibration by the operation of the movable component.

The subtracter 7332d subtracts the velocity offset, which is calculated by the integration unit 7332c, from the velocity calculated by the integration unit 7332a, thereby calculating a velocity variation due to only the vibration (camera shake) of the body 1.

The velocity calculator 7333 includes an integration unit which calculates the velocity, based on the acceleration which is input from the zero point correction unit 732a, 732b. In addition, immediately after the vibration period, the velocity calculator 7333 executes a correction of adding the velocity variation, which is estimated by the velocity variation estimation unit 7332, to the calculated velocity.

The shake amount calculator 7334 calculates an image blur correction amount, based on the velocity obtained by the velocity calculator 7333. The shake amount calculator 7334 includes a multiplication unit 7334a and an integration unit 7334b.

The multiplication unit 7334a multiplies the velocity, which is calculated by the velocity calculator 7333, by an image magnification which is acquired by the communication with the system controller 6 via the communication unit 734, thereby calculating a translational velocity of an image on the imaging plane of the image-capturing element 4.

The integration unit 7334b integrates the translational velocity of the image, which is input from the multiplication unit 7334a, thereby calculating a translational movement amount of the image on the imaging plane of the image-capturing element 4 as the image blur correction amount.

Figure 6:
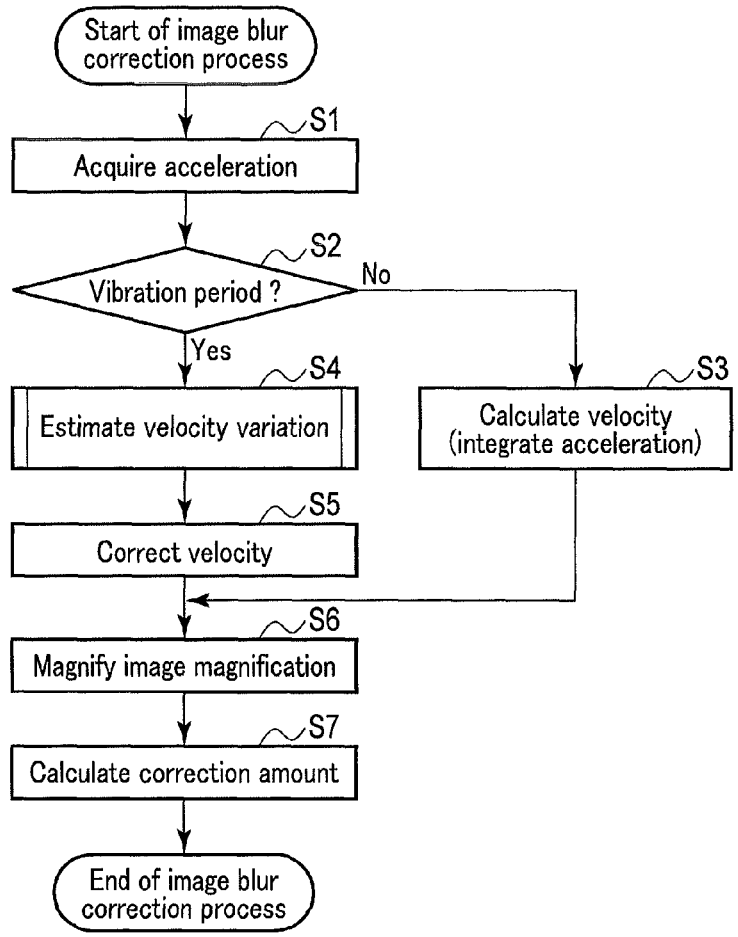
FIG. 6 is a flowchart illustrating a process of calculating an image blur correction amount.

FIG. 6 is a flowchart illustrating a process of calculating an image blur correction amount. In FIG. 6, the translational shake correction unit 733 acquires values of acceleration via the zero point correction units 732a, 732b (step S1).

Subsequently, the translational shake correction unit 733 determines, by the vibration period detector 7331, whether the present period is a vibration period or not (step S2).

Figure 7:
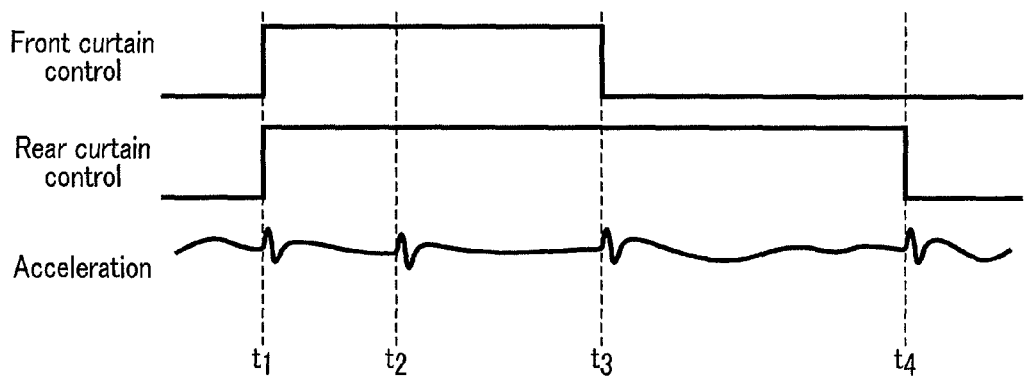
FIG. 7 is a view illustrating a relationship between a shutter control signal and an acceleration.

Next, the vibration period is explained. Here, a description is given of the vibration period of the focal plane shutter 3 as an example of the vibration due to the operation of the movable component. FIG. 7 is a view illustrating a relationship between a shutter control signal and an acceleration.

The shutter control signal in the case of the focal plane shutter is divided into a front-curtain control signal and a rear-curtain control signal. The front-curtain control signal and rear-curtain control signal are control signals for controlling magnets for attracting the front curtain and rear curtain of the focal plane shutter. In the example of FIG. 7, while the control signal is "High", a magnetic force of the magnet is generated.

A timing t1 in FIG. 7 is a timing at which the front curtain and rear curtain of the focal plane shutter 3 are attracted. Due to vibration at this timing t1, acceleration occurs. In addition, a timing t2 is a timing at which levers for attracting the front curtain and rear curtain of the focal plane shutter 3 are evacuated. Due to vibration occurring at the timing t2, too, acceleration occurs. These timings t1 and t2 are detected as vibration periods. In usual cases, a time interval from timing t1 to timing t2 is a fixed time interval. Accordingly, if the time interval between the timings t1 and t2, which is the timing of rising of the front-curtain control signal and rear-curtain control signal, is determined, for example, at a time of design of the camera, the timing t2 can be detected from the timing t1.

A timing t3 in FIG. 7 is timing when the front curtain of the focal plane shutter 3 runs. Due to vibration occurring at the time of running of the front curtain at the timing t3, too, acceleration occurs. This timing t3 is also detected as a vibration period. In general, the timing t3 varies depending on aperture setting. However, as understood from FIG. 7, the timing t3 can be detected as a timing at which the front-curtain control signal changes to "Low".

A timing t4 is timing when the rear curtain of the focal plane shutter 3 runs. Due to vibration occurring at the time of running of the front curtain at the timing t4, too, acceleration occurs. Here, the timing t4 is a timing of the end of the exposure period. Vibration occurring at this timing does not affect an image which is captured. Thus, the vibration can be ignored as the vibration period in this embodiment.

As described above, the vibration due to the focal plane shutter 3 occurs due to the operation thereof. Accordingly, it is possible to determine the vibration period, from the levels of the front-curtain control signal and rear-curtain control signal serving as the shutter control signal. By detecting the vibration period by using the shutter control signal, the vibration occurring due to the operation of the focal plane shutter 3 can be detected without using the camera setting.

If the vibration period is not determined in step S2, the translational shake correction unit 733 calculates the velocity by integrating the acceleration by the velocity calculator 7333 (step S3). On the other hand, if the vibration period is determined in step S2, the translational shake correction unit 733 estimates the velocity variation during the vibration period by the velocity variation estimation unit 7332 (step S4).

Figure 8:
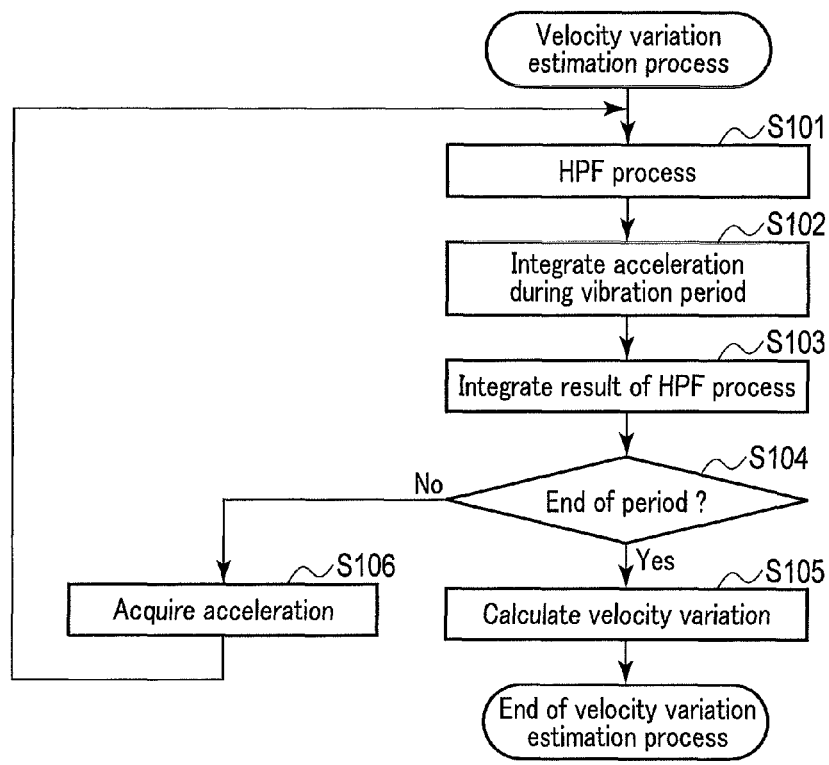
FIG. 8 is a flowchart illustrating a velocity variation estimation process in the first embodiment.

FIG. 8 is a flowchart illustrating the velocity variation estimation process in the first embodiment. In FIG. 8, the velocity variation estimation unit 7332 executes, by the HPF 7332b, an HPF (High Pass Filtering) process on the signal of the zero point corrected acceleration (step S101). By the HPF process, a component relating to camera shake in the signal of the acceleration is eliminated, and only a component relating to the movable component (focal plane shutter 3) is extracted.

Next, the velocity variation estimation unit 7332 integrates, by the integration unit 7332a, the zero point corrected acceleration (step S102). In addition, the velocity variation estimation unit 7332 integrates, by the integration unit 7332c, the HPF-processed acceleration (step S103).

Subsequently, the velocity variation estimation unit 7332 determines whether the vibration period has ended or not, from the detection result of the vibration period detector 7331 (step S104).

If the vibration period has not ended, the velocity variation estimation unit 7332 acquires the acceleration (step S106). Thereafter, the velocity variation estimation unit 7332 repeats the process of step 101 to step S104.

If the vibration period has ended, the velocity variation estimation unit 7332 subtracts, by the subtracter 7332*d*, the integration value of S103 from the integration value of S102, and integrates, by the velocity calculator 7333, the input from the subtracter 7332*d*, thereby calculating the velocity variation based on the camera shake during the vibration period (step S105).

Hereinafter, reverting back to the description of FIG. 6, after the velocity variation estimation process, the translational shake correction unit 733 executes, by the velocity calculator 7333, the calculation and correction of the velocity (step S5).

After the calculation or correction of the velocity, the translational shake correction unit 733 multiplies, by the multiplication unit 7334*a* of the shake amount calculator 7334, the value of the velocity, which is input from the velocity calculator 7333, by an image magnification (step S6). Thereby, the translational velocity of the body 1 is converted to the translational velocity of the image on the imaging plane. Then, the translational shake correction unit 733 integrates the value of the velocity which is input from the multiplication unit 7334*a*, thereby calculating the image blur correction amount (step S7).

Figure 9:
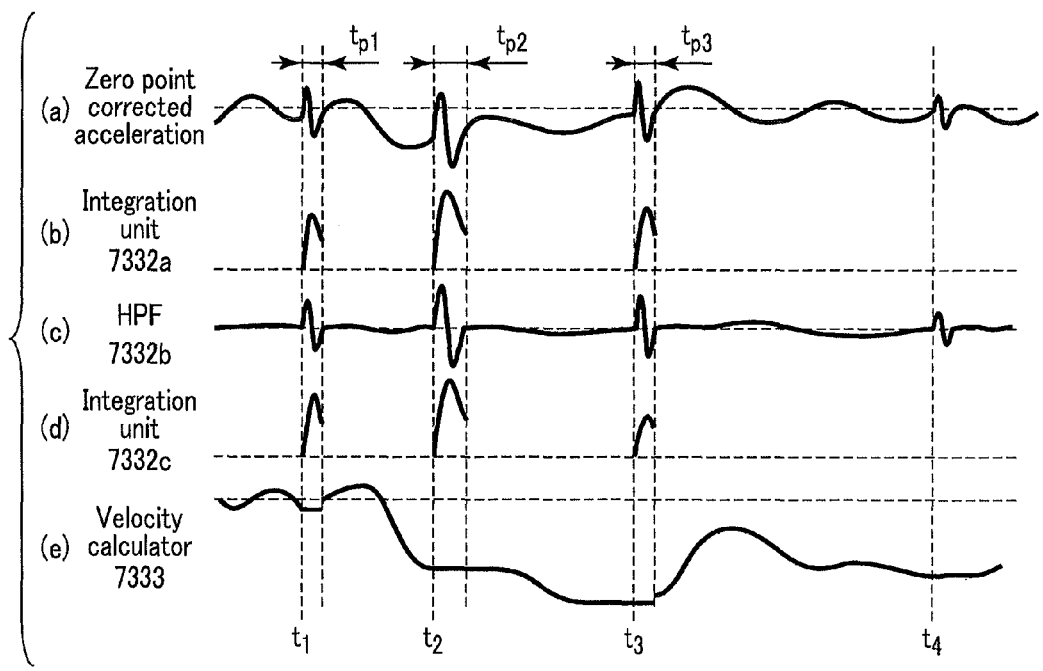
FIG. 9 is a view illustrating variations with time of signals occurring within the translational shake correction unit.

FIG. 9 is a view illustrating variations with time of signals occurring within the translational shake correction unit 733. As in illustrated in part (a) of FIG. 9, noise occurring from vibration due to the operation of the movable component is superimposed, at timings t1 to t4 that are vibration periods, on the signal of the zero point corrected acceleration which is the input of the translational shake correction unit 733.

The integration unit 7332*a* integrates the signals of the zero point corrected acceleration, which are input at the timings t1 to t3 that are vibration periods. Accordingly, as illustrated in part (b) of FIG. 9, the integration result at this time includes both an integration result of the acceleration component due to the vibration (camera shake) of the body 1 and an integration result of the acceleration component due to the vibration of the focal plane shutter 3.

The HPF 7332*b* eliminates a low-frequency component in the zero point corrected acceleration that is input. Accordingly, as illustrated in part (c) of FIG. 9, the output of the HPF 7332*b* is the signal of the acceleration component due to the vibration of the focal plane shutter 3.

The integration unit 7332*c* integrates the input from the HPF 7332*b*. Accordingly, as illustrated in part (d) of FIG. 9, the output of the integration unit 7332*c* is an integration result of the acceleration components due to the vibration of the focal plane shutter 3 during the vibration period.

The velocity calculator 7333 integrates, in periods other than the vibration period, the signal of the zero point corrected acceleration that is input. On the other hand, at a time point of the end of the vibration period, the velocity calculator 7333 executes correction of velocity, by which the integration result of the acceleration component due to the vibration of the focal plane shutter 3 is subtracted from the integration result of the signal of the zero point corrected acceleration. Accordingly, the output of the velocity calculator 7333 will become as illustrated in part (e) of FIG. 9.

As has been described above, according to the present embodiment, the noise component, which occurs from the vibration due to the operation of the movable component, is subtracted from the velocity obtained during the vibration period. Thereby, even when noise occurs in the acceleration occurring from the vibration due to the operation of the movable component, the effect of the noise is removed and the exact translational velocity is calculated. Thus, the exact image blur correction amount can be calculated.

Here, in the example of FIG. 5, the integration unit 7332*a* and the velocity calculator 7333 are constructed as separate units, and the operation of the velocity calculator 7333 is switched according to whether the time period is the vibration period or not. However, the integration unit 7332*a* and the velocity calculator 7333 may be constructed as one unit. In this case, at the time point of the end of the vibration period, such correction is made that the integration result of the integration unit 7332*c* is subtracted from the integration result of the velocity calculator 7333.

Second Embodiment

Figure 10:
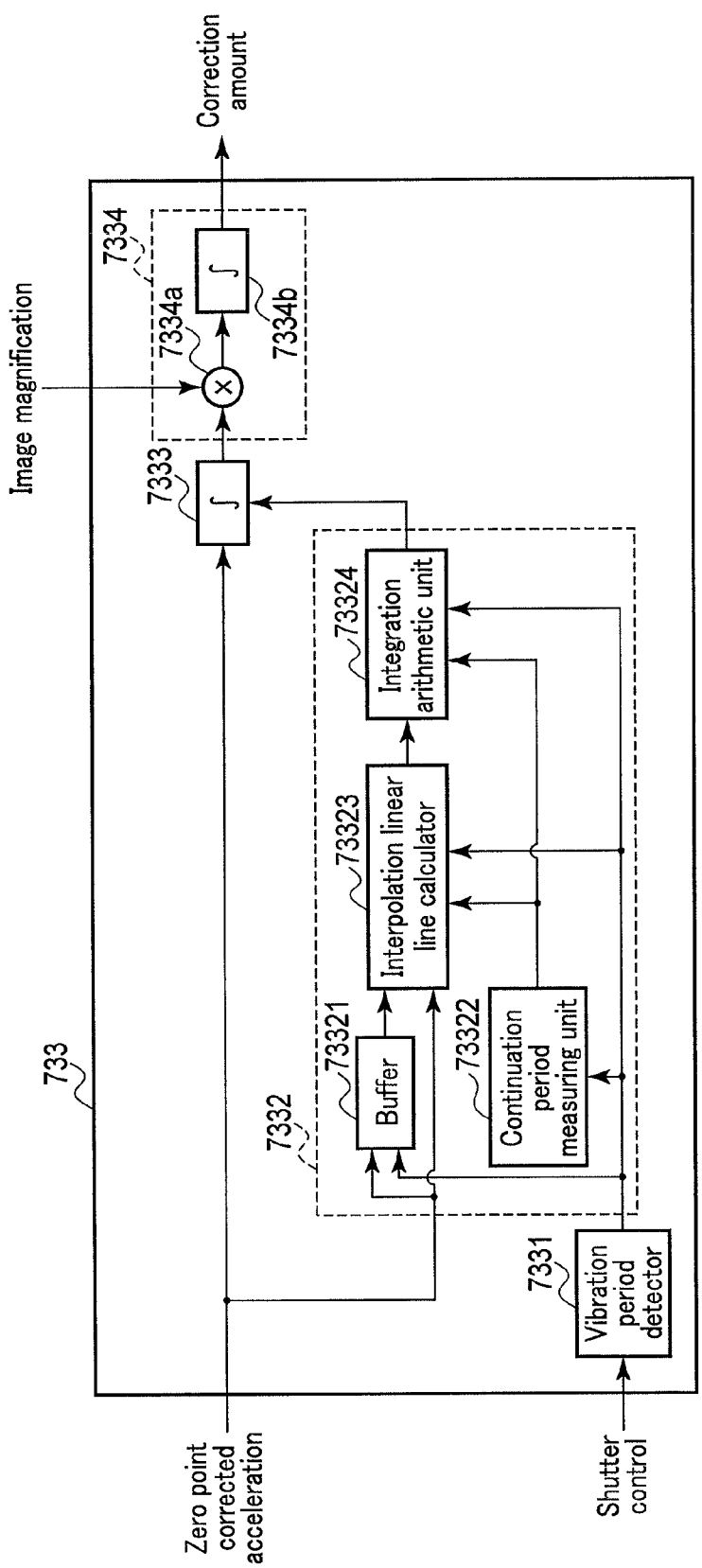
FIG. 10 is a view illustrating a detailed configuration of a translational shake correction unit in a second embodiment.

Next, a second embodiment of the present invention is described. FIG. 10 is a view illustrating a detailed configuration of a translational shake correction unit 733 in the second embodiment. Incidentally, in FIG. 10, the same structure as in FIG. 5 is denoted by the same reference numerals as in FIG. 5. The second embodiment differs from the first embodiment with respect to the configuration of the velocity variation estimation unit 7332. Thus, hereinafter, the structure and operation of the velocity variation estimation unit 7332 are mainly described.

The velocity variation estimation unit 7332 in the second embodiment includes a buffer 73321, a continuation period measuring unit 73322, an interpolation linear line calculator 73323, and an integration arithmetic unit 73324.

The buffer 73321 stores an acceleration amount at a time point when the start of the vibration period is detected by the vibration period detector 7331.

The continuation period measuring unit 73322 measures a continuation period from the detection of the start of the vibration period by the vibration period detector 7331 to the end of the vibration period. Here, the continuation period measuring unit 73322 is, for example, a counter which counts up one by one, each time an acquisition timing of acceleration has passed since the time point when the start of the vibration period is detected.

The interpolation linear line calculator 73323, which is an example of an interpolation unit, calculates interpolation points on an interpolation linear line indicative of the acceleration during the vibration period, by using the acceleration at the time of the start of the vibration period, which is stored in the buffer 73321, and the (present) acceleration value after the end of the vibration period, when the end of the vibration period is detected by the vibration period detector 7331.

The integration arithmetic unit 73324 estimates the velocity variation during the vibration period by integrating the interpolation linear line, which is calculated by the interpolation linear line calculator 73323, during the continuation period measured by the continuation period measuring unit 73322.

Figure 11:
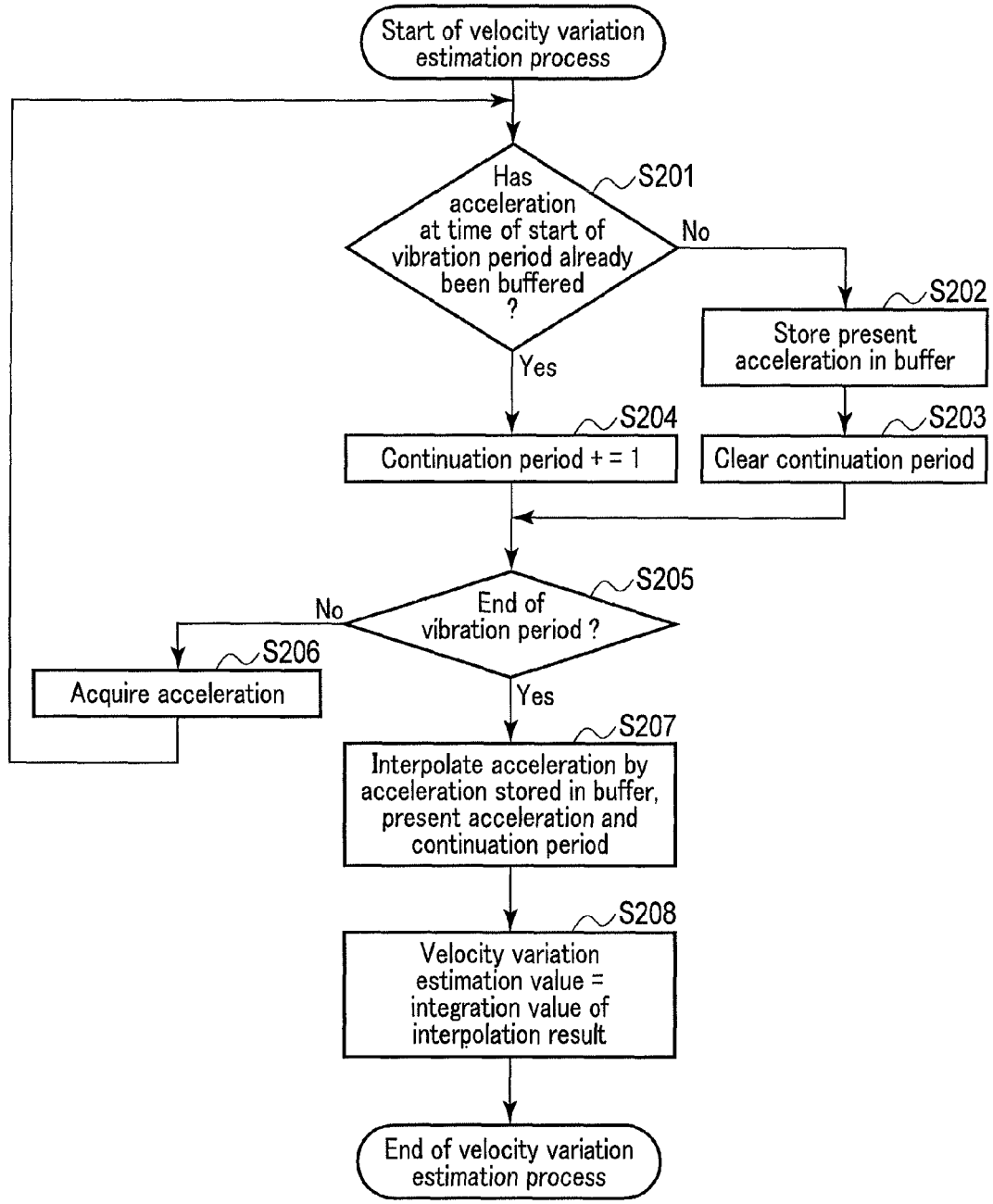
FIG. 11 is a flowchart illustrating a velocity variation estimation process in the second embodiment.

FIG. 11 is a flowchart illustrating a velocity variation estimation process in the second embodiment. In FIG. 11, the velocity variation estimation unit 7332 determines whether the acceleration is stored in the buffer 73321 or not (step S201).

If the acceleration is not stored, the velocity variation estimation unit 7332 stores the input zero point corrected acceleration in the buffer 73321 (step S202). Subsequently, the velocity variation estimation unit 7332 clears the value of the continuation period, which is measured by the continuation period measuring unit 73322, to "0", and starts the measurement of the continuation period (step S203).

If the acceleration is stored, the velocity variation estimation unit 7332 counts up the value of the continuation period by the continuation period measuring unit 73322 (step S204).

Subsequently, the velocity variation estimation unit 7332 determines once again whether the present period is the vibration period or not, from the detection result of the vibration period detector 7331 (step S205). If the present period is the vibration period, the velocity variation estimation unit 7332 acquires the acceleration (S206). Thereafter, the velocity variation estimation unit 7332 repeats the process of step S201 to step S205.

If the vibration period has ended, the velocity variation estimation unit 7332 calculates an interpolation linear line indicative of the acceleration variation during the vibration period by utilizing the acceleration stored in step S202, the continuation period measured in step S204, and the present acceleration. The interpolation linear line is given by the following equation 1 (step S207).

$$\text{ACC\_i}[n] = n/N \times (\text{Acc\_a0} - \text{Acc\_b0}) + \text{Acc\_b0} \quad (N \neq 0) \quad \text{(equation 1)}$$
$$= \text{Acc\_b0} \quad (N = 0)$$

Here, Acc_i[n] in equation 1 is the value of acceleration at an n-th interpolation position. Acc_b0 is the value of Acceleration stored in the buffer 73321. Acc_a0 is the value of (present) acceleration after the end of the vibration period. N is a continuation period, with the time point of the start of the vibration period being set to be 1. N is counted up each time the process is S204 is executed. In addition, n is the number of samples, with the time point of the start of the vibration period being set to be 0.

Next, the velocity variation estimation unit 7332 integrates, by the integration arithmetic unit 73324, the interpolation linear line, which is calculated by the interpolation linear line calculator 73323, during the continuation period measured in step S204, thereby calculating an estimation value of the velocity variation (step S208). This integration arithmetic is expressed by the following equation 2.

$$Vd = \sum_{n=0}^{N} \text{Acc\_i}[n] \quad \text{(equation 2)}$$

Instead of the arithmetic expressed by equation 2, an arithmetic using each parameter included in equation 1 may be performed. This arithmetic is expressed by the following equation 3.

$$Vd = (\text{Acc\_b0} + \text{Acc\_a0}) \times (N+1)/2 \quad \text{(equation 3)}$$

Figure 12:
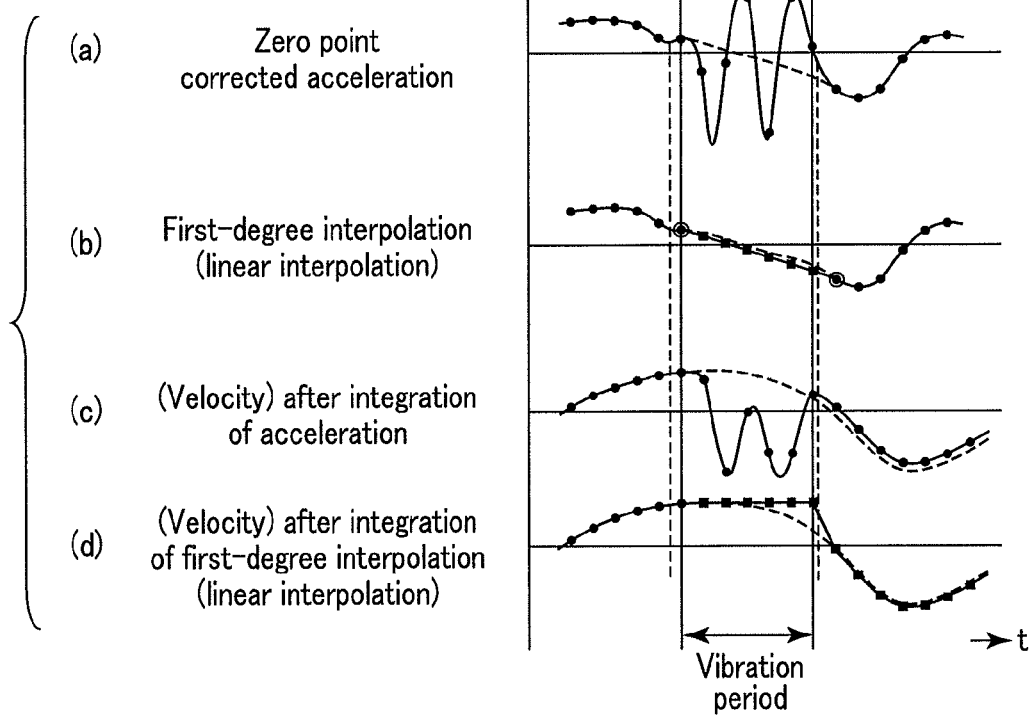
FIG. 12 is a view illustrating the relationship between an acceleration during a vibration period and a velocity as an integration result of the acceleration in the second embodiment.

FIG. 12 is a view illustrating the relationship between an acceleration amount during a vibration period and a velocity as an integration result of the acceleration in the second embodiment.

The acceleration during the vibration period includes, in addition to the acceleration component due to camera shake, the acceleration component occurring form the vibration due to the operation of the movable component such as the focal plane shutter 3. Thus, as illustrated in part (a) of FIG. 12, the waveform of the acceleration during the vibration period is greatly distorted. Here, a broken line in part (a) of FIG. 12 indicates the state in which the acceleration occurs only due to the vibration of the body 1, when it is assumed that there is no acceleration component occurring from the vibration due to the operation of the movable component.

The interpolation linear line calculator 73323 interpolates the acceleration during the vibration period by a linear expression (linear line), by utilizing the accelerations at sampling points before and after the vibration period. Black double circles in part (b) of FIG. 12 indicate accelerations which are used for interpolation, and black squares in FIG. 12 indicate acceleration s generated by the interpolation. As is understood from a comparison between part (a) of FIG. 12 and part (b) of FIG. 12, the acceleration obtained by linear interpolation becomes substantially equal to the state of only the acceleration value due to the vibration of the body 1.

Part (c) of FIG. 12 illustrates the velocity obtained by integrating the acceleration which is not subjected to the interpolation in the interpolation linear line calculator 73323. Since the velocity obtained in this case includes the velocity occurring from the vibration of the operation of the movable component, the waveform is greatly distorted.

Part (d) of FIG. 12 illustrates the velocity obtained by integrating the acceleration after subjected to the interpolation in the interpolation linear line calculator 73323, that is, the output of the integration arithmetic unit 73324. In this case, the velocity obtained after the end of the vibration period coincides with the velocity indicated by a broken line in part (c) of FIG. 12.

As has been described above, according to the present embodiment, the acceleration during the vibration period is estimated by the linear interpolation using the accelerations before and after the vibration period. Thereby, even if vibration occurs, the effect of the vibration can be eliminated, and the translational velocity can exactly be calculated.

Modification 1 of the Second Embodiment

Figure 13:
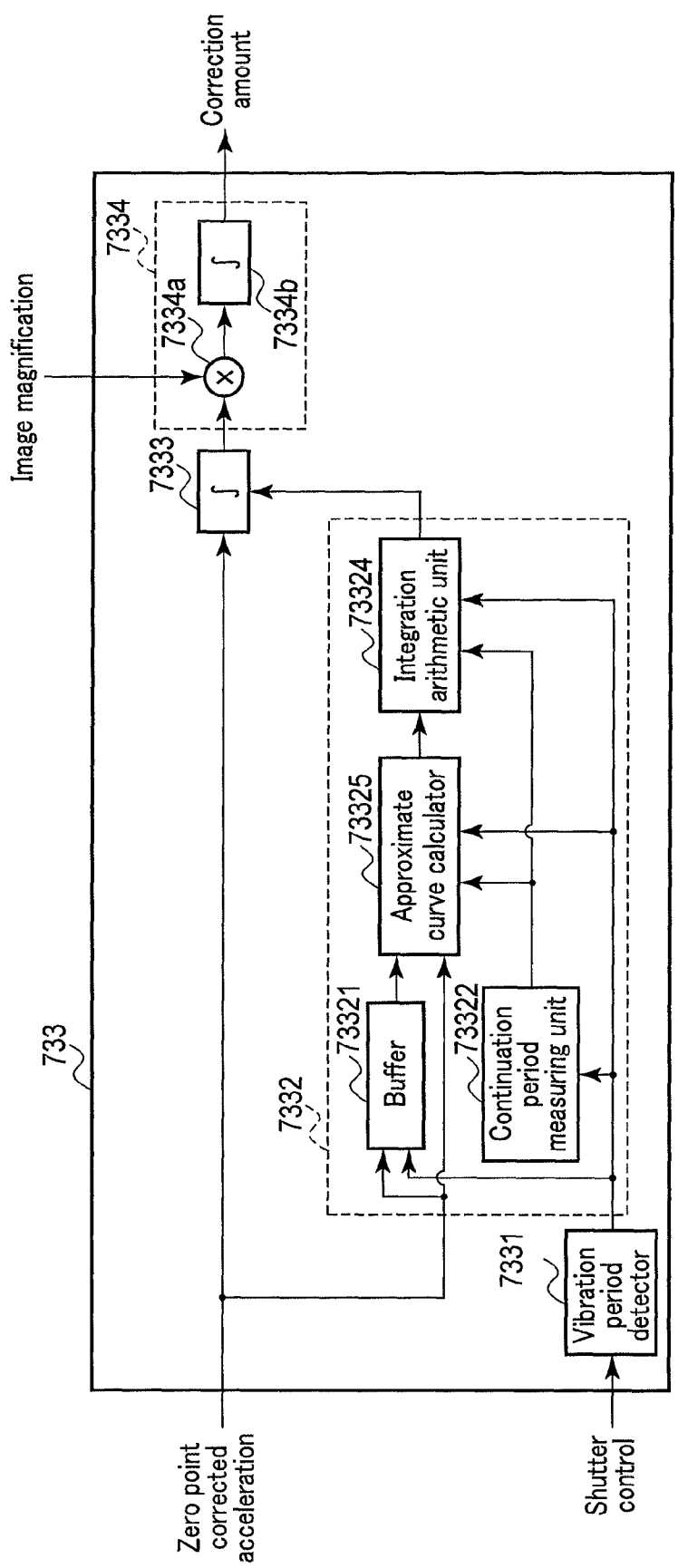
FIG. 13 is a view illustrating a detailed configuration of a translational shake correction unit in Modification 1 of the second embodiment.

Next, modifications of the second embodiment of the invention will be described. FIG. 13 is a view illustrating a detailed configuration of a translational shake correction unit 733 in Modification 1 of the second embodiment. Incidentally, in FIG. 13, the same structure as in FIG. 10 is denoted by the same reference numerals as in FIG. 10. Modification 1 differs from the second embodiment in that the interpolation linear line calculator 73323 is replaced with an approximate curve calculator 73325. In addition, Modification 1 differs from the second embodiment in that, while the buffer 73321 in the second embodiment stores only the acceleration at the of the start of the vibration period, the buffer 73321 in Modification 1 stores accelerations at a plurality of time points.

The buffer 73321 of Modification 1 stores, as a front-side acceleration, an acceleration of one sample at the time of the start of the vibration period or a plurality of samples. Further, the buffer 73321 stores, as rear-side accelerations, defined accelerations of 0 or more samples after the end of the vibration period. Here, the reason why the buffer 73321 stores accelerations of 0 or more samples as the rear-side accelerations are that, if the number of samples, which is necessary as the rear-side accelerations, is set to be 1, the number of samples for the rear-side acceleration is satisfied if the present acceleration is acquired.

When the accelerations of a necessary number of samples have been accumulated in the buffer 73321, the approximate curve calculator 73325, which is another example of the interpolation unit, calculates an approximate curve indicative of the acceleration of only the vibration component of the body 1 during the vibration period, by using the front-side acceleration and rear-side acceleration stored in the buffer 73321 and the present acceleration.

Figure 14:
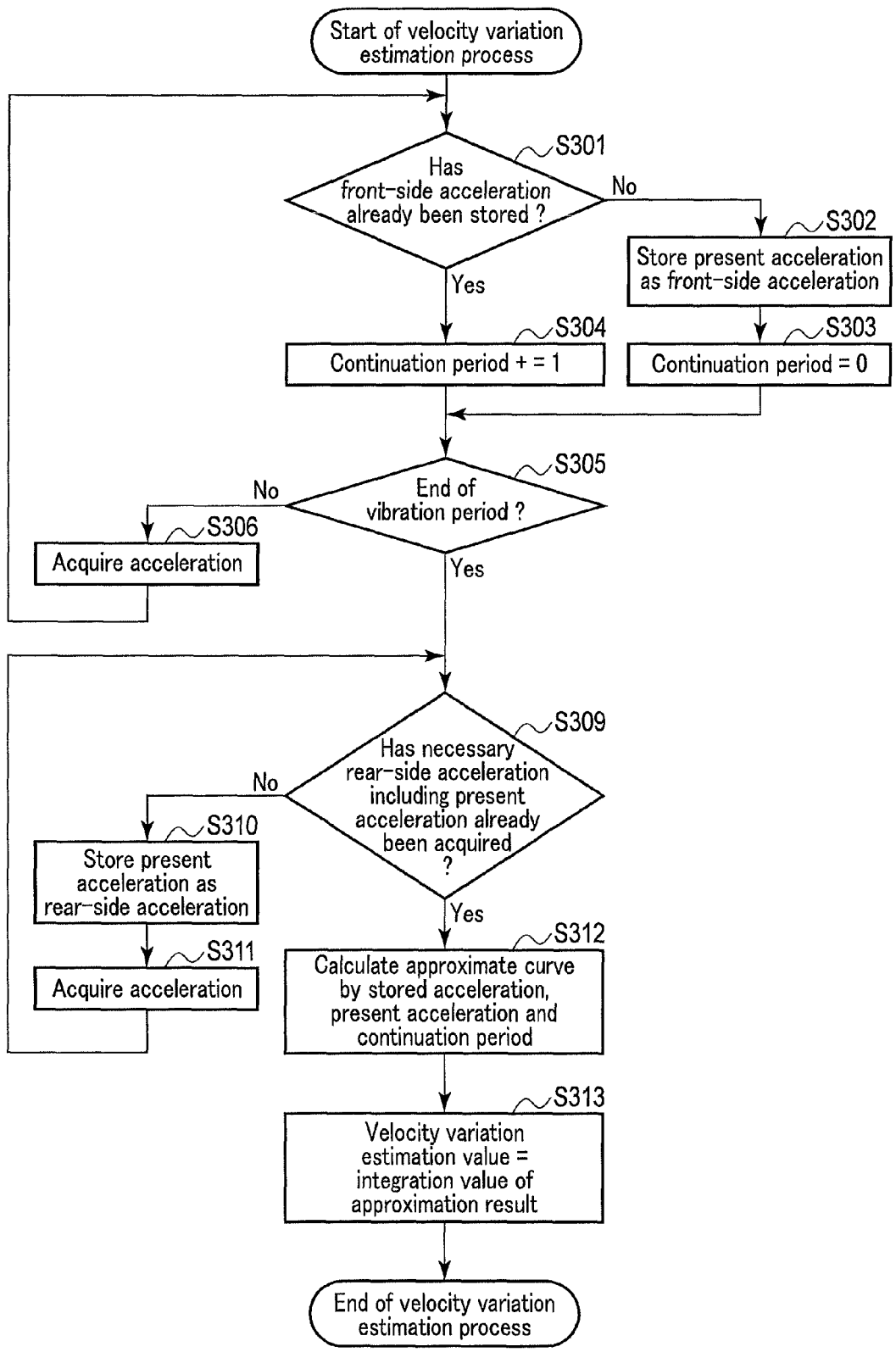
FIG. 14 is a flowchart illustrating a velocity variation estimation process in Modification 1.

FIG. 14 is a flowchart illustrating a velocity variation estimation process in Modification 1. If the velocity variation estimation process is started, the velocity variation estimation unit 7332 determines whether the front-side acceleration is stored in the buffer 73321 (step S301).

If the front-side acceleration is not stored, the velocity variation estimation unit 7332 stores the present zero point corrected acceleration, which is input, in the buffer 73321 as the front-side acceleration (step S302). Subsequently, the velocity variation estimation unit 7332 clears the value of the continuation period, which is calculated by the continuation period measuring unit 73322, to "0", and starts the measurement of the continuation period (step S303).

If the acceleration is stored, the velocity variation estimation unit 7332 counts up the value of the continuation period by the continuation period measuring unit 73322 (step S304).

Subsequently, the velocity variation estimation unit 7332 determines once again whether the present period is the vibration period or not, from the detection result of the vibration period detector 7331 (step S305). If the present period is the vibration period, the velocity variation estimation unit 7332 acquires the acceleration (S306). Thereafter, the velocity variation estimation unit 7332 repeats the process of step S301 to step S305.

If the vibration period has ended, the velocity variation estimation unit 7332 confirms whether the accelerations of the necessary number of samples for calculating an approximate curve has been acquired (step S309). For example, if the number of samples, which is necessary as the rear-side acceleration, is set to be 1, the number of points of the rear-side acceleration is satisfied if the present acceleration is acquired. On the other hand, if the number of samples, which is necessary as the rear-side acceleration, is set to be 2 or more and the rear-side acceleration, excluding the present acceleration, is not stored, the input present zero point corrected acceleration is stored in the buffer 73321 as the rear-side acceleration (step S310). Then, the velocity variation estimation unit 7332 acquires the acceleration once again (S311). Thereafter, the velocity variation estimation unit 7332 repeats the process of step S309 to step S311 until the rear-side acceleration of the necessary number of samples is acquired.

If the accelerations of the necessary number of samples for calculating the approximate curve has been acquired, the velocity variation estimation unit 7332 calculates, by the approximate curve calculator 73325, an approximate curve indicative of the acceleration variation during the vibration period, by using the front-side acceleration stored in step S302, the continuation period measured in step S304, and the rear-side acceleration (including the present acceleration) stored in step S310 (step S312). The approximate curve of the acceleration, with the estimation section (from the time point of the start of the vibration period to the time point of the end of the vibration period) being n=[−1, N], is given by the following equation 4.

$$\text{Acc\_i}[n] = \alpha \times n^2 + \beta \times n + \gamma, \quad \text{(equation 4)}$$

where $$\begin{pmatrix} \alpha \\ \beta \\ \gamma \end{pmatrix} = \begin{pmatrix} 1 & -1 & 1 \\ 0 & 0 & 1 \\ N^2 & N & 1 \end{pmatrix}^{-1} \cdot \begin{pmatrix} \text{Acc\_b1} \\ \text{Acc\_b0} \\ \text{Acc\_a0} \end{pmatrix}$$

Here, Acc_i[n] in equation 4 is the value of acceleration at an n-th interpolation position. Acc_b1 is the value of the front-side acceleration stored in the buffer 73321. Acc_b0 is the value of the rear-side acceleration stored in the buffer 73321. Acc_a0 is the value of the present acceleration after the end of the vibration period. N is a continuation period, with the time point of the start of the vibration period being set to be 0. N is counted up each time the process of S304 is executed. In addition, n is the number of samples, with the time point of the start of the vibration period being set to be 0.

Next, the velocity variation estimation unit 7332 integrates, by the integration arithmetic unit 73324, the approximate curve, which is calculated by the approximate linear line calculator 73323, during the continuation period measured in step S304, thereby calculating an estimation value of the velocity variation (step S313). This integration arithmetic is expressed by the following equation 5.

$$Vd = \sum_{n=-1}^{N} \text{Acc\_i}[n] \quad \text{(equation 5)}$$

Here, the number of acceleration stored in the buffer 73321 is determined by the degree of the approximate curve calculated by the approximate curve calculator 73325. If the degree is 1, the same as in the second embodiment applies. The relationship between the number of samples x of the front-side acceleration and the number of samples y of the rear-side acceleration, which are necessary for the calculation of the approximate curve, is, for example, as follows. One sample of the rear-side accelerations is the value of the present acceleration. Accordingly, the number of samples of the rear-side acceleration, which needs to be stored in the buffer 73321, is y−1.

When the degree is 1, (x, y)=(1, 1).
When the degree is 2, (x, y)=(2, 1) or (1, 2).
When the degree is 3, (x, y)=(2, 2).

In this manner, various methods for setting the samples of acceleration can be selected in accordance with the degree of the polynomial which becomes the approximate curve. However, if the degree is an odd number, it is preferable to make the number of samples of the front-side acceleration greater than the number of samples of the rear-side acceleration. Thereby, the timing of a return to the calculation process of the normal velocity after the vibration period can be made earlier, and the precision of velocity calculation can be made higher. Furthermore, this contributes to reduction in release time lag.

In addition, instead of the arithmetic of equation 5, a definite integral for equation 4 may be performed. This arithmetic is expressed by equation 6. However, when a definite integral is performed according to equation 6, it is necessary to perform integration, with the estimation section being set to be n=[−1, N+1].

$$Vd = \alpha \times ((N+1)3-1)/3 + \beta \times ((N+1)2-1)/2 + \gamma \times ((N+1)-1) \quad \text{(equation 6)}$$

Figure 15:
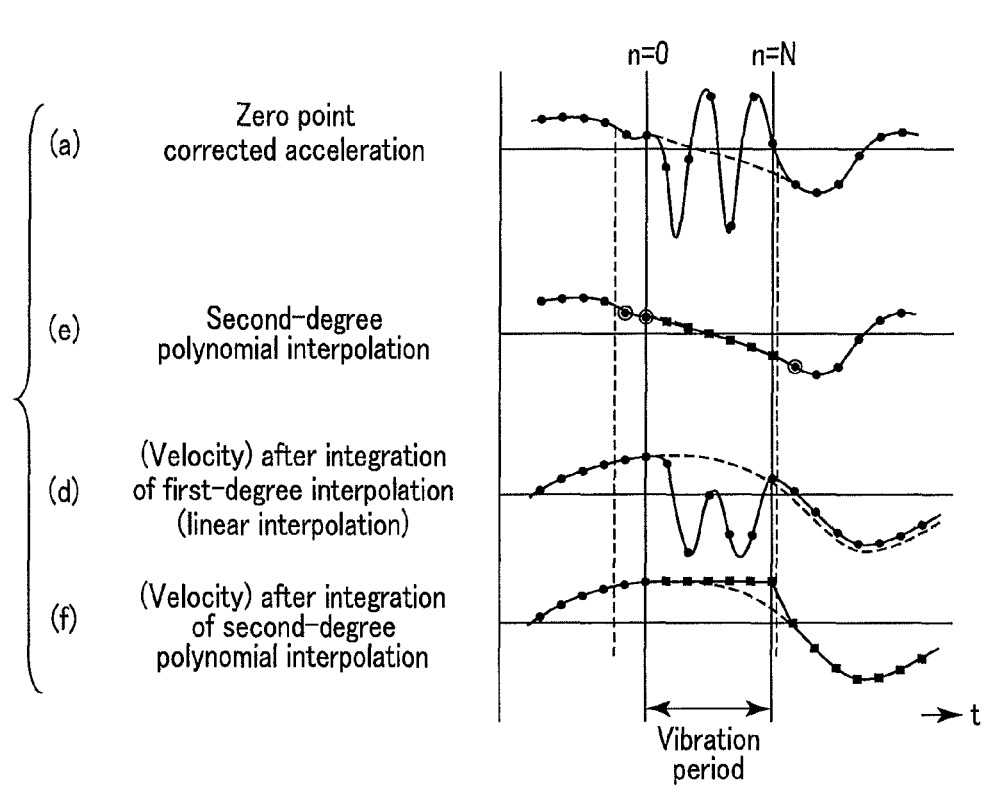
FIG. 15 is a view illustrating the relationship between an acceleration during a vibration period and a velocity as an integration result of the acceleration in Modification 1.

FIG. 15 is a view illustrating the relationship between the acceleration during the vibration period and the velocity as an integration result of the acceleration in Modification 1. Incidentally, FIG. 15 illustrates an example in which quadratic polynomial interpolation is performed, with two samples being set for the front-side acceleration and one sample being set for the rear-side acceleration. Here, since the polynomial interpolation is utilized in the example of FIG. 15, an approximate curve of acceleration, which has a higher precision than the case of the linear interpolation of FIG. 12, can be obtained.

Modification 2 of the Second Embodiment

In Modification 1 of the second embodiment, the approximate curve is calculated by using the polynomial interpolation. However, it is not always necessary to use the polynomial interpolation for the calculation of the approximate curve. Modification 2 is an example in which an approximate curve is calculated by a least square method.

In usual cases, the acceleration, which is detected by the acceleration sensor, includes noise. Thus, when the performance of the acceleration sensor is low and the amount of noise included in the acceleration is large, it is not always possible to secure a sufficient precision by the interpolation arithmetic for calculating a curve which necessarily passes through sampled acceleration points. In the case of such a system, it is desirable to calculate an approximate curve by other methods such as a least square method.

In the case of using the least square method, like the interpolation arithmetic, the degree of the approximate curve and the number of points of samples for use in the calculation can properly be varied. However, in the case of the least square method, when the degree of the approximate curve is set to be L, accelerations of L+2 samples or more, before and after the vibration period, are utilized.

Hereinafter, a description is given of a case of calculating a quadratic approximate curve by using four samples in total, namely two samples for the front-side acceleration and two samples for the rear-side acceleration. For example, an approximate curve of acceleration of an estimation section n=[−1, N+1] is given by the following equation 7.

$$\mathrm{Acc\_i}[n] = \alpha \times n^2 + \beta \times n + \gamma, \quad \text{(equation 7)}$$

where $$\begin{pmatrix} \alpha \\ \beta \\ \gamma \end{pmatrix} = \begin{pmatrix} -1 & -1 & 1 \\ 0 & 0 & 1 \\ N^2 & N & 1 \\ (N+1)^2 & N+1 & 1 \end{pmatrix}^+ \cdot \begin{pmatrix} \mathrm{Acc\_b1} \\ \mathrm{Acc\_b0} \\ \mathrm{Acc\_a0} \\ \mathrm{Acc\_a1} \end{pmatrix}$$

Here, Acc_i[n] in equation 7 is the value of acceleration at an n-th interpolation position. Acc_b1 is the value of the front-side acceleration immediately after the vibration period, which is stored in the buffer 73321. Acc_b0 is the value of the front-side acceleration which is stored in the buffer 73321, one sample immediately after the vibration period. Acc_a0 is the value of the rear-side acceleration which is stored in the buffer 73321, one sample after the end of the vibration period. Acc_a1 is the value of the rear-side acceleration (present acceleration) which is stored in the buffer 73321, two samples after the end of the vibration period. N is a continuation period, with the time point of the start of the vibration period being set to be 0. N is counted up each time the process of S304 is executed. In addition, n is the number of samples, with the time point of the start of the vibration period being set to be 0. A matrix M$^+$ is a pseudo-inverse matrix of a matrix M.

In addition, an integral arithmetic for the result of equation 7 is expressed by the following equation 8.

$$Vd = \sum_{n=1}^{N+1} \mathrm{Acc\_i}[n] \quad \text{(equation 8)}$$

Modification 3 of the Second Embodiment

In the above-described second embodiment and modifications thereof, an approximate curve of a predetermined degree is calculated in the interpolation arithmetic. Here, in general, compared to the linear approximation, the calculation cost for higher-degree approximation increases. Thus, it is proper to change the degree of the approximate curve in accordance with the required precision. The required precision of the approximate curve varies depending on the exposure condition of the imaging device and the distance to the subject. For example, when the shutter speed is slow or the image magnification is large, it is necessary to calculate the approximate curve with higher precision.

Figure 16:
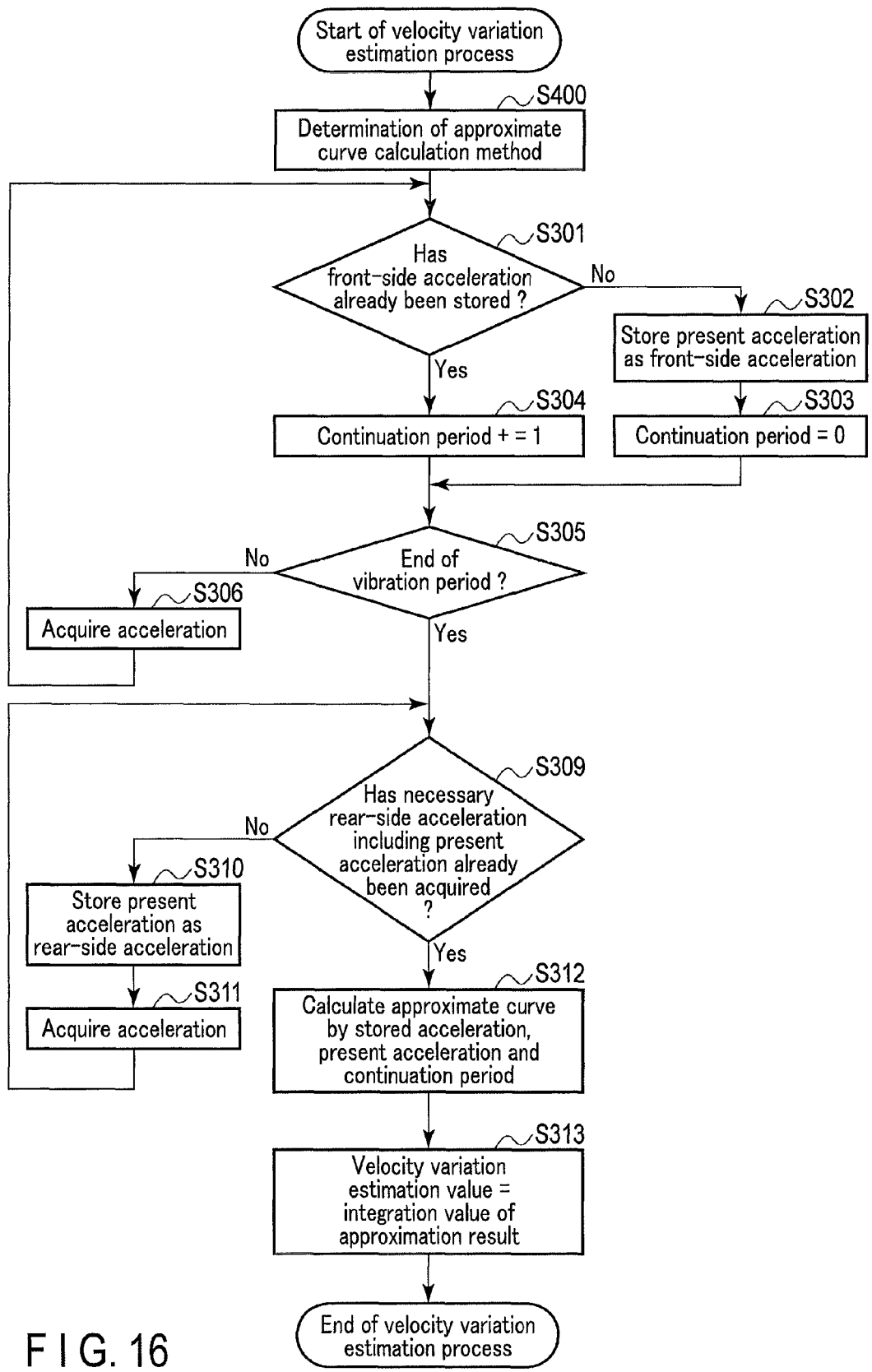
FIG. 16 is a flowchart illustrating a velocity variation estimation process in Modification 3.

FIG. 16 is a flowchart illustrating a velocity variation estimation process in Modification 3. In FIG. 16, a process of determining an approximate curve calculation method of step S400 is added to the flowchart of FIG. 14. As described above, the approximate curve calculation method can be determined by using, for example, the shutter speed or image magnification. Here, the information of the shutter speed or image magnification is information which is notified by the system controller 6 functioning as a controller.

For example, in the case in which the shutter speed is set as a reference for determination, if the shutter speed is faster than 1/100 sec., the approximate curve calculation method is performed by using linear approximation. If the shutter speed is slower than 1/100 sec., the approximate curve calculation method is performed by using higher-degree approximation. In addition, in the case in which the image magnification is set as a reference, if the image magnification is less than 1/10, the approximate curve calculation method is performed by using linear approximation. If the image magnification is 1/10 or more, the approximate curve calculation method is performed by using higher-degree approximation.

Here, a higher-degree approximate curve means an approximate curve calculated by using acceleration at two or more points of either or both of the front-side acceleration and the rear-side acceleration. The shutter speed and image magnification, which are set as determination references for determining the approximate curve calculation method, also vary depending on the shapes, etc. of the optical system 2 and body 1. Thus, the determination reference may be experimentally found. In addition, the determination reference may set by using both the shutter speed and image magnification, or only one of them may be used.

As described above, in Modification 3, the interpolation arithmetic is performed in accordance with the required precision of interpolation, and thereby interpolation can be performed at a proper calculation cost.

Modification 4 of the Second Embodiment

In the above-described second embodiment and the modifications thereof, as the front-side acceleration which is used for calculation of the approximate curve, the acceleration at the time point of detection of vibration (actually, immediately after vibration detection) is used. However, in this case, there is a concern that the detection is delayed, depending on the kind of vibration. At this time, the calculation of the acceleration and velocity would be executed by utilizing the information during the vibration period. As a countermeasure against this, it may be possible to store only accelerations at plural points before the detection of vibration in the buffer, and to calculate an approximate curve by using samples, which are stored after the detection of vibration, as the front-side acceleration.

Figure 17:
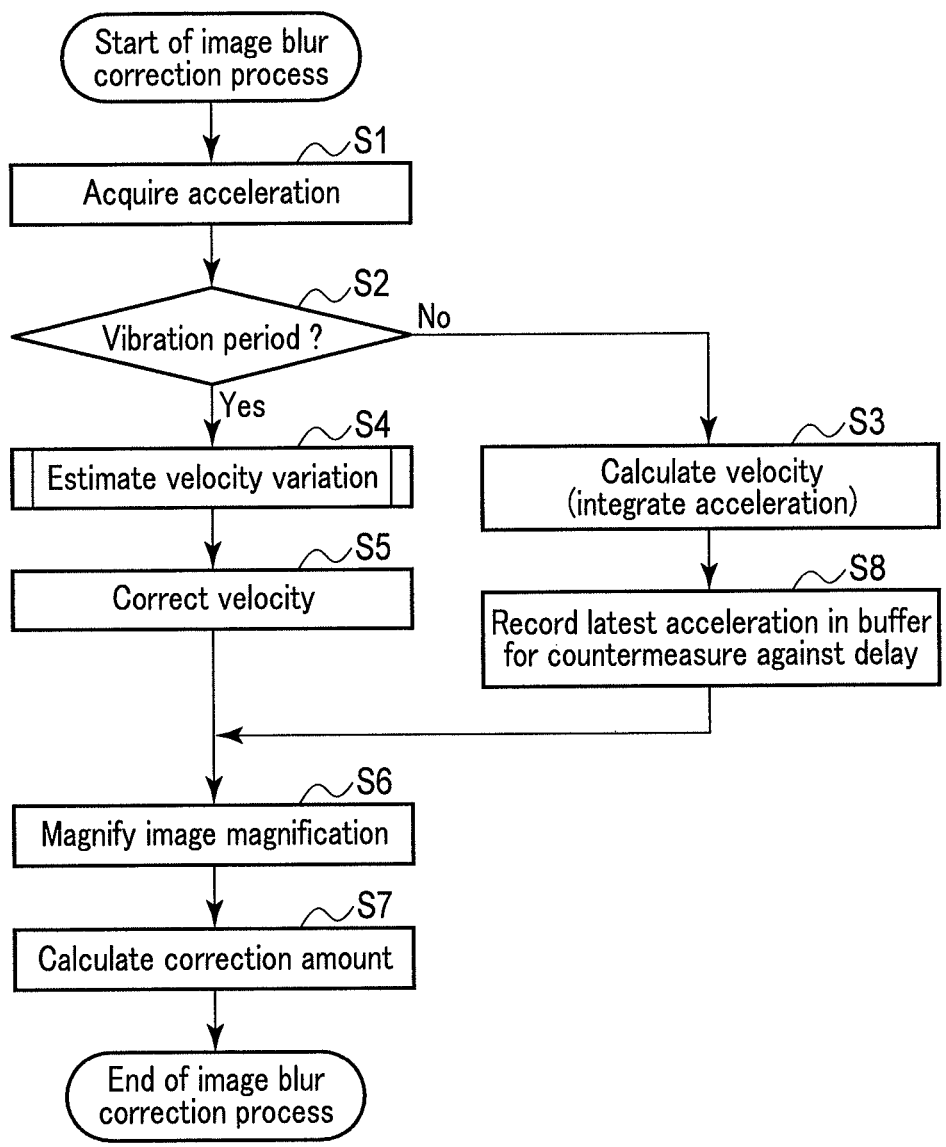
FIG. 17 is a flowchart illustrating an image blur correction process in Modification 4.

FIG. 17 is a flowchart illustrating an image blur correction process in Modification 4. In addition, FIG. 18 is a flowchart illustrating a velocity variation estimation process in Modification 4.

To begin with, a description is given of FIG. 17. Here, in FIG. 17, a description of the processes common to those in FIG. 6 is omitted. If the vibration period is not determined in step S2, the translational shake correction unit 733 calculates the velocity by integrating the acceleration by the velocity calculator 7333 (step S3). Subsequently, the translational shake correction unit 733 stores, in the buffer 73321, acceleration of plural samples for a countermeasure against delay (step S8). Here, the number of samples of acceleration, which are stored in the buffer 73321 in step S8 is set to be the sum or more of an assumed vibration detection delay sample number Z and a sample number x of front-side accelerations which are used for calculation of the approximate curve. In the other respects, the same process as in FIG. 6 is executed.

Next, a description is given of FIG. 18. In FIG. 18, the velocity variation estimation unit 7332 clears the value of the continuation period, which is measured by the continuation period measuring unit 73322, to "0" (step S501). Next, the velocity variation estimation unit 7332 counts up the value of the continuation period measured by the continuation period measuring unit 73322 (step S502).

Subsequently, the velocity variation estimation unit 7332 determines whether the vibration period has ended or not, from the detection result of the vibration period detector 7331 (step S503). If the vibration period has not ended, the velocity variation estimation unit 7332 acquires the acceleration (S504). Thereafter, the velocity variation estimation unit 7332 repeats the process of step S502 and step S503.

If the vibration period has ended, the velocity variation estimation unit 7332 confirms whether the acceleration of the necessary number of samples for calculating an approximate curve has been acquired (step S505). For example, if the number of samples, which is necessary as the rear-side acceleration, is set to be 1, the number of points of the rear-side acceleration is satisfied if the present acceleration is acquired. On the other hand, if the number of samples, which is necessary as the rear-side acceleration, is set to be 2 or more and the rear-side accelerations, excluding the present acceleration, is not stored, the input present zero point corrected acceleration is stored in the buffer 73321 as the rear-side acceleration (step S506). Then, the velocity variation estimation unit 7332 acquires the acceleration once again (S507). Thereafter, the velocity variation estimation unit 7332 repeats the process of step S505 to step S507 until the rear-side acceleration of the necessary number of samples is acquired.

If the accelerations of the necessary number of samples for calculating the approximate curve has been acquired, the velocity variation estimation unit 7332 calculates, by the approximate curve calculator 73325, an approximate curve indicative of the acceleration variation during the vibration period, by utilizing the front-side acceleration stored in step S8, the continuation period measured in step S502, and the rear-side acceleration (including the present acceleration) stored in step S506 (step S508). The approximate curve of the acceleration, with the estimation section being n=[1−Z, N], is given by the following equation 9.

$$\text{Acc\_i}[n] = (n+Z)/(N+1+Z) \times (\text{Acc\_a0} - \text{Acc\_b0}[Z]) + \text{Acc\_b}[Z] \quad \text{(equation 9)}$$

Here, Acc_i[n] in equation 9 is the value of acceleration at an n-th interpolation position. Acc_b[Z] is the value of the front-side acceleration stored in the buffer 73321 before the detection of vibration. Z=0 is the above-described acceleration immediately before the vibration. Acc_a0 is the value of the present acceleration after the end of the vibration period. N is a continuation period, with the time point of the start of the vibration period being set to be 1. N is counted up each time the process of step S502 is executed. In addition, n is the number of samples, with the time point of the start of the vibration period being set to be 1.

Next, the velocity variation estimation unit 7332 integrates, by the integration arithmetic unit 73324, the approximate curve, which is calculated by the approximate curve calculator 73325, during the continuation period measured in step S304, thereby calculating an estimation value of the velocity variation (step S509). This integration arithmetic is expressed by the following equation 10. Equation 10 represents an arithmetic operation of adding the present acceleration to the sum of the interpolation result of the vibration period n=[1, N], and subtracting the velocity variation during the period that is Z samples before the time of detection of vibration.

$$Vd = \sum_{n=1-Z}^{N} \text{Acc\_i}[n] + \text{Acc\_}a0 - \sum_{z=0}^{Z-1} \text{Acc\_b}[z] \quad \text{(equation 10)}$$

By this Modification 4, even in the case where the detection of vibration by the vibration period detector 7331 is delayed, an accurate velocity variation can be calculated.

Modification 5 of the Second Embodiment

In the above-described second embodiment and the modifications thereof, after the end of the vibration period, the velocity variation during the vibration period is estimated. In this case, in a state in which vibration of the movable component, etc. is continuously applied, the estimation section of the approximate curve increases, and the calculation precision of the approximate curve tends to lower. Thus, if the continuation period becomes long, it is desirable to stop the calculation of the velocity variation estimation value, and to reset the output of the velocity calculator 7333. By this Modification 5, the calculation precision of the approximate curve can be kept high.

Figure 19:
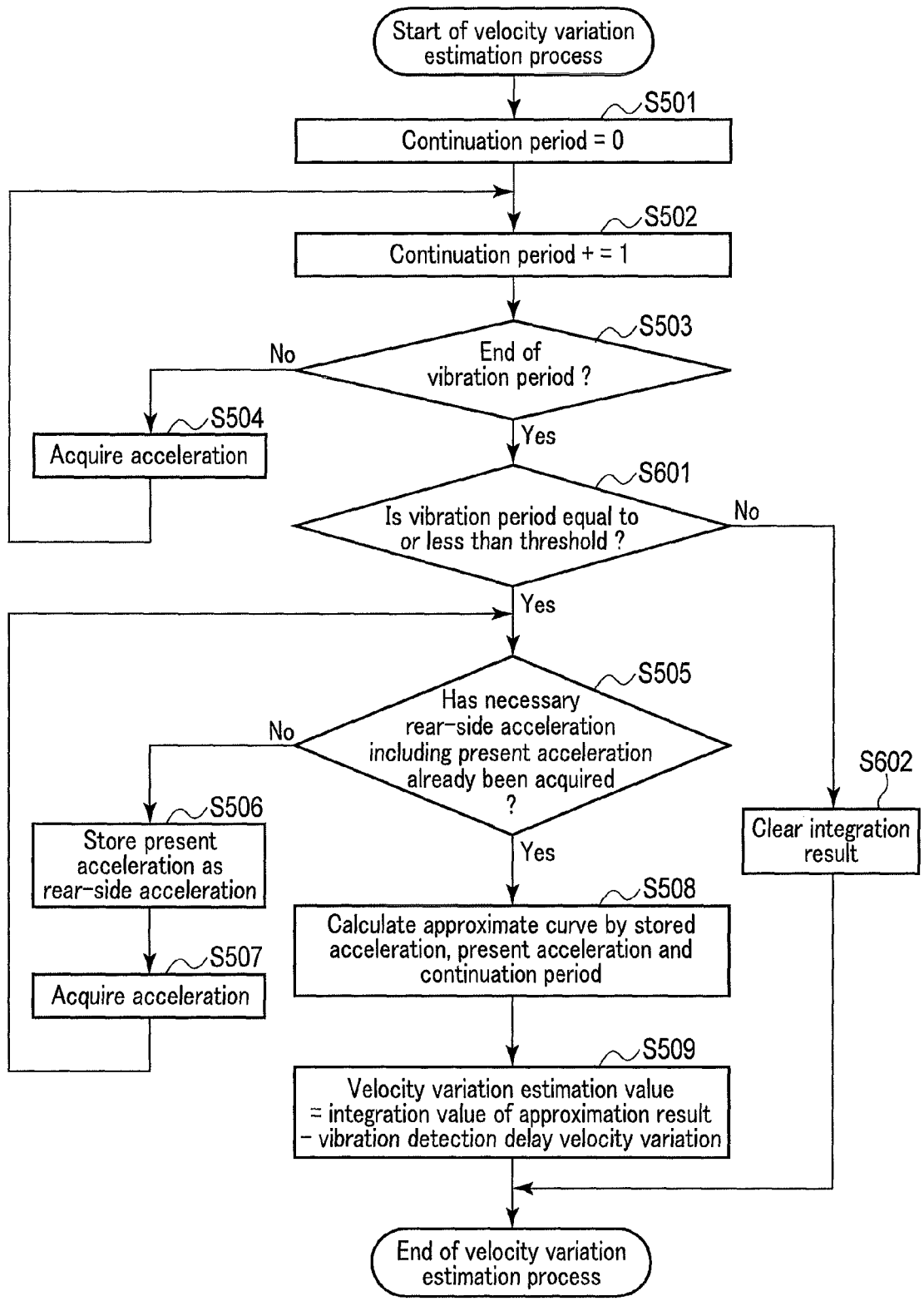
FIG. 19 is a flowchart illustrating a velocity variation estimation process in Modification 5.

FIG. 19 is a flowchart illustrating a velocity variation estimation process in Modification 5. Here, in FIG. 19, a description of the processes common to those in FIG. 18 is omitted. In step S503, if the vibration period has ended, the velocity variation estimation unit 7332 determines whether the vibration period (continuation period) is a threshold (an experimental value; e.g. 100 ms) or less, from the measurement result of the continuation period measuring unit (step S601). If the continuation period is the threshold or less, the velocity variation estimation unit 7332 executes hereafter the same process as in FIG. 18. On the other hand, if the continuation period exceeds the threshold, the velocity variation estimation unit 7332 clears the integration result in the velocity calculator 7333 (step S602). Thereby, the velocity variation estimation value is cleared to "0".

Modification 6 of the Second Embodiment

In the above-described embodiment and the modifications thereof, the velocity variation during the vibration period is estimated by utilizing the acceleration after the end of the vibration period. Accordingly, during the vibration period, exact image blur correction cannot be executed. In this case, during the exposure period, if the acceleration during the vibration period is utilized as such, the effect of image blur correction becomes higher. Thus, the velocity variation estimation may not be executed during the exposure period, by not determining the vibration period during the exposure period.

Third Embodiment

Figure 20:
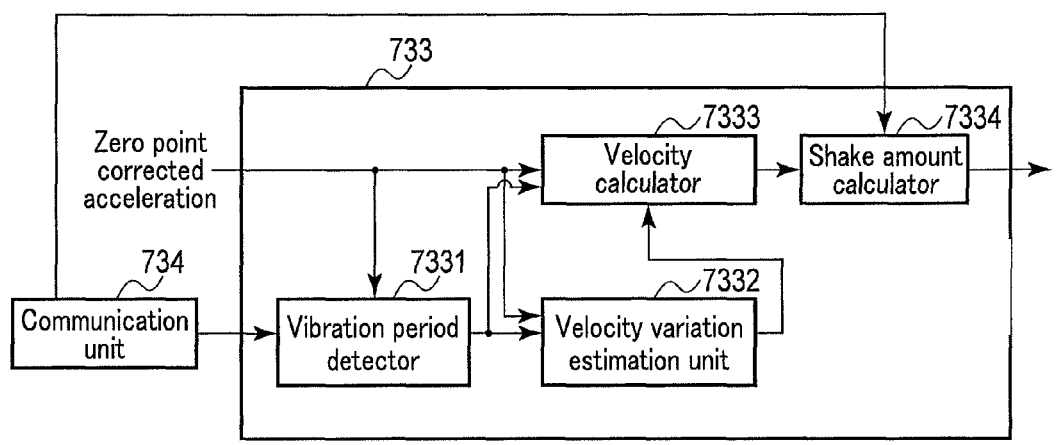
FIG. 20 is a view illustrating a detailed configuration of a translational shake correction unit 733 in a third embodiment.

Next, a third embodiment of the present invention is described. FIG. 20 is a view illustrating a detailed configuration of a translational shake correction unit 733 in the third embodiment. Incidentally, in FIG. 20, the same structure as in FIG. 5 is denoted by the same reference numerals as in FIG. 5. The third embodiment differs from the preceding embodiment in that the zero point corrected acceleration, which is detected via the acceleration sensor, is also input to the vibration period detector 7331.

In the above-described embodiment and the modifications thereof, the vibration period is detected by utilizing the control signal of the movable component such as the focal plane shutter 3. However, the detection method of the vibration period is not limited to this. For example, while the variation in acceleration is being monitored by the vibration period detector 7331, if a variation in acceleration, which is sufficiently greater than assumed by normal camera shake, is detected, the vibration period may be determined. Besides, in the case of utilizing the variation in acceleration, if the difference between the average of acceleration of M samples and the present acceleration is a predetermined value or more, the vibration period may be determined. Furthermore, the vibration period may be detected by combining a plurality of methods.

By determining the vibration period by monitoring the acceleration as in the third embodiment, it is possible to detect, for example, vibration occurring due to handling by the user, other than the vibrations due to the operations of movable components, such as the operation of the focal plane shutter 3, the charge operation of a flush device, the operation of the instant return mirror, and the operation of the aperture. The vibration occurring due to handling by the user includes vibration occurring in the body 1 by the operation of the user, such as vibration occurring when the user pressed the button of the release switch or the like and vibration occurring when the user rotated the command dial, and vibration occurring in a state in which the user has no intention, such as vibration occurring when the strap ring or buckle of the camera strap comes in contact with the body 1.

Fourth Embodiment

In the above-described embodiment and modifications thereof, in order to calculate the image blur correction amount, the acceleration is integrated two times. In this embodiment, the acceleration detected by the acceleration sensor 8 is subjected to the zero point correction. However, when an error due to other than the effect of gravity occurs between the actual reference value of the acceleration sensor 8 and the zero point corrected by the zero point correction unit 732a, 732b, the error is increased by the two-time integrations. If the integration for a long period is continued in this state, the disparity between an image blur correction amount, which is to be actually obtained, and a calculated image blur correction amount increases. Thus, it is desirable to calculate the velocity from an angular velocity which is detected by an angular velocity sensor, instead of integrating the calculated velocity as such.

FIG. 21 is a block diagram illustrating an internal configuration of a shake correction microcomputer 7 according to the fourth first embodiment. The shake correction microcomputer 7 in the fourth embodiment includes ADCs (analog-to-digital converters) 74a and 74b, in addition to the SIOs 71a and 71b, driver 72 and CPU 73. The CPU 73 further includes zero point correction units 735a and 735b. In addition, as illustrated in FIG. 21, the ADCs 74a and 74b are connected to angular velocity sensors 12a and 12b.

The angular velocity sensor 12a, 12b detects the angular velocity about an axis which is set on the body 1. The angular velocity sensor 12a detects an angular velocity in the pitch direction. In addition, the angular velocity sensor 12b detects an angular velocity in the yaw direction.

The ADC 74a converts an output signal of the angular velocity sensor 12a to a digital signal. The ADC 74b converts an output signal of the angular velocity sensor 12b to a digital signal.

The zero point correction unit 735a, 735b subtracts, from the angular velocity signal acquired by the angular velocity sensor, a signal level (zero point) which is acquired when the angular velocity of the body 1 becomes zero, thereby eliminating an offset component, and matching the zero point of the angular velocity with a predetermined reference value. Here, the zero point correction unit 735a corrects the zero point of the pitch-directional angular velocity. The zero point correction unit 735b corrects the zero point of the yaw-directional angular velocity.

Figure 22:
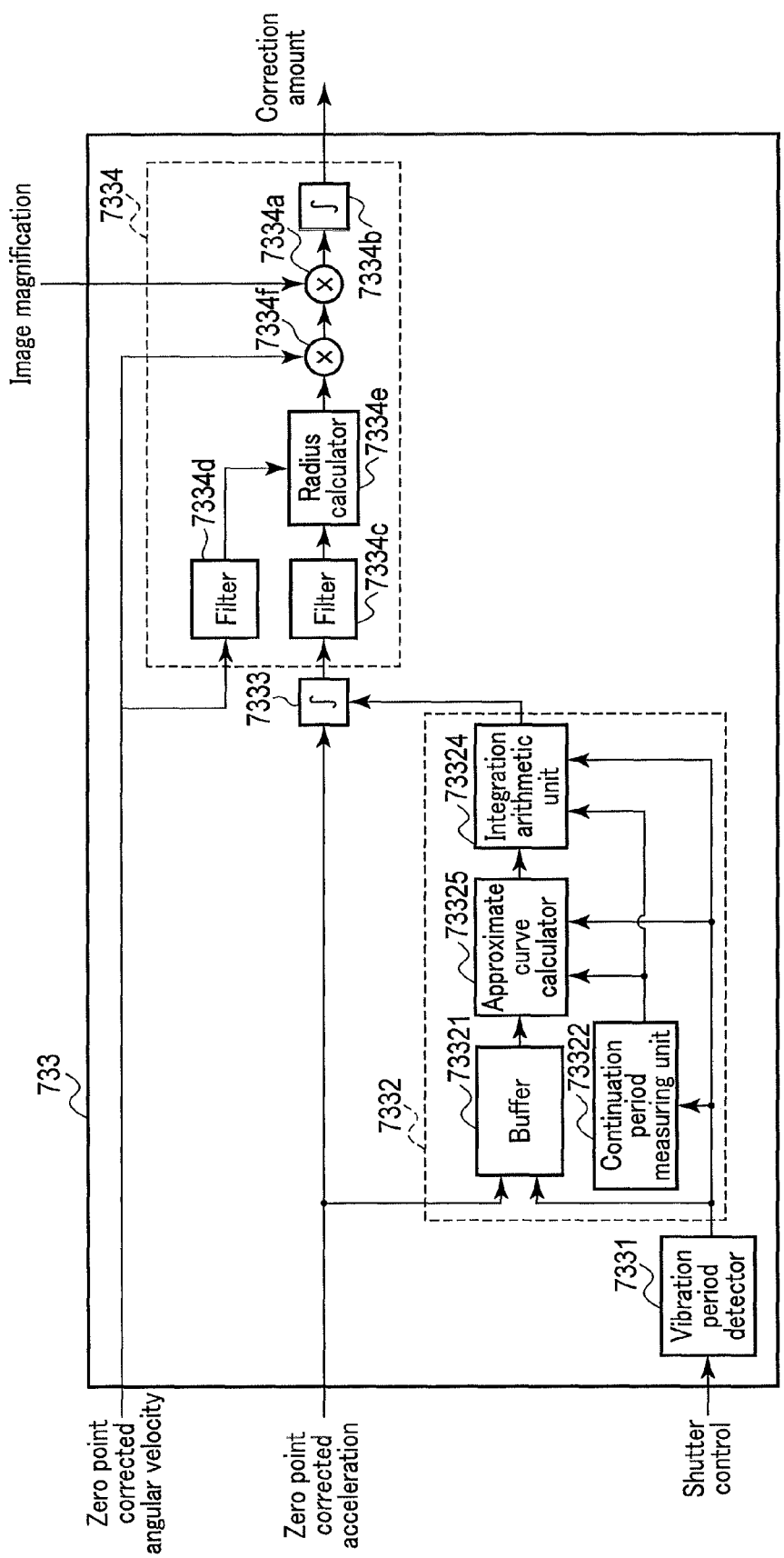
FIG. 22 is a block diagram illustrating details of a translational shake correction unit 733 in the fourth embodiment.

FIG. 22 is a block diagram illustrating details of a translational shake correction unit 733 in the fourth embodiment. FIG. 22 is a block diagram relating to only one axis. Actually, the translational shake correction unit 733 with the configuration illustrated in FIG. 22 exits for each of the two axes, namely the X axis and Y axis. In addition, in the example of FIG. 22, a one-axis angular velocity is made to correspond to a one-axis acceleration. On the other hand, a method in which two-axis angular velocities are made to correspond to a one-axis acceleration is proposed and known. This method can be utilized in the present embodiment, too.

In FIG. 22, the same structure as in FIG. 10 is denoted by the same reference numerals as in FIG. 10. The configuration of the translational shake correction unit 733 illustrated in FIG. 22 differs from the configuration of the translational shake correction unit 733 illustrated in FIG. 10, with respect to the configuration of the shake amount calculator 7334. Hereinafter, the different points from FIG. 10 are mainly described.

As illustrated in FIG. 22, the shake amount calculator 7334 in the fourth embodiment includes filters 7334c and 7334d, a radius calculator 7334e and a multiplication unit 7334f, in addition to the multiplication unit 7334a and integration unit 7334b.

The filter 7334c is a filter which adjusts a frequency characteristic and a phase characteristic in a signal of velocity obtained by the velocity calculator 7333. For example, the filter 7334c is an HPF which eliminates a low-frequency component in the signal of velocity. As described above, the frequency of camera shake is, in general, in a range of about 1 Hz to 10 Hz. Accordingly, by eliminating a frequency of 1 Hz or less by the filter 7334c, the effect of a temperature drift, etc. in the signal of velocity, which is detected by the acceleration sensor, is eliminated.

The filter 7334d is a filter which adjusts a frequency characteristic and a phase characteristic in the zero point corrected angular velocity which is input from the ADC. This filter 7334d has a function of matching the frequency characteristics and phase characteristics between the velocity signal obtained by the velocity calculator 7333 and the signal of angular velocity detected via the angular velocity sensor. When the frequency characteristics and phase characteristics are different between the acceleration sensor and the angular velocity sensor, the filter 7334d adjusts the frequency characteristic and phase characteristic of the signal of angular velocity, so that the frequency characteristics and phase characteristics of the signals of velocity may become identical.

The radius calculator 7334e divides the output of the filter 7334c by the output of the filter 7334d, thereby calculating a radius of gyration. Since the calculation is the division, when the absolute value of the output of the filter 7334d is close to 0, the calculation value of the radius diverges to infinity. In this case, the radius cannot be calculated with sufficient precision. Thus, if the output of the filter 7334d is a predetermined value or less, the radius calculator 7334e does not perform new division, and fixes the output. In addition, when the vibration period is being detected by the vibration period detector 7331, it is possible that a component due to the vibration of the movable component, etc. is included in the velocity obtained by the velocity calculator 7333. Thus, also when the vibration period is being detected by the vibration period detector 7331, the radius calculator 7334e does not update the output.

The multiplication unit 7334f multiplies the radius calculation value, which is input from the radius calculator 7334e, by the angular velocity that is input from the ADC, thereby calculating the translational velocity.

The operations of the multiplication unit 7334a and integration unit 7334b are the same as in FIG. 10, so a description thereof is omitted.

As has been described above, according to the present embodiment, by calculating the translational velocity by also using the angular velocity, the calculation precision of the translational movement amount can be further improved.

Here, in the present embodiment, the radius of gyration is calculated from the ratio between the angular velocity and the translational velocity, and the ultimate translational velocity is calculated based on the calculated radius of gyration. A plurality of calculation methods of the translational velocity of the body, which utilize the angular velocity sensor, have been proposed. Aside from the method described in the present embodiment, any calculation method, which uses the integration value of acceleration in the calculation process, is applicable.

Fifth Embodiment

In the second embodiment, the acceleration sensor is used for calculation of the translational velocity. In the fourth embodiment, the acceleration sensor and angular velocity sensor are used for calculation of the translational velocity. A fifth embodiment is an example in which the motion speed of an image, which is obtained by calculating a motion vector, is used for calculation of the translational velocity.

In general, in the state in which the camera is displaying a through-image, the information acquired by the image-capturing element 4 is processed by the system controller 6 and is utilized for display. The system controller 6 in the present embodiment also executes calculation of a motion vector by using the information which is acquired by the image-capturing element 4 while a through-image is being displayed. The calculated motion vector can be utilized as the image blur correction amount.

Here, immediately before the exposure period, the image-capturing element 4 is light-shielded by the focal plane shutter 3. Thus, the calculation of the motion vector is disabled. When the calculation of the motion vector has become impossible, the calculation of the translational velocity is performed by utilizing the inputs from the acceleration sensor and angular velocity sensor, which have been described in the above embodiments and modifications thereof.

Although the present invention has been described above based on the embodiments, this invention is not limited to the above-described embodiments. Needless to say, various modifications and applications can be implemented without departing from the spirit of the present invention.

What is claimed is:

1. A shake amount detection device comprising:
   an acceleration sensor configured to detect an acceleration which is applied to a body;
   a vibration period detector configured to detect a vibration period during which vibration that becomes a predetermined acceleration is applied to the body;
   a velocity variation estimation unit configured to estimate a first movement velocity which is a component velocity due to an attitude movement of the body during the vibration period, based on the acceleration detected by the acceleration sensor;
   a velocity calculator configured to calculate a second movement velocity that is a velocity of the body, based on the acceleration, and to correct the second movement velocity, based on the first movement velocity estimated by the velocity variation estimation unit, in a case of the vibration period as a detection result of the vibration period detector; and
   a shake amount calculator configured to calculate an image blur correction amount, which is an image movement amount occurring due to the attitude movement of the body, relative to the vibration applied to the body, based on the second movement velocity corrected by the velocity calculator.

2. The shake amount detection device of claim 1, wherein the velocity variation estimation unit includes:
   an interpolation unit configured to interpolate and calculate an acceleration during the vibration period by using accelerations before and after the vibration period, the acceleration being a component due to the attitude movement of the body during the vibration period; and
   an integration arithmetic unit configured to estimate the first movement velocity during the vibration period by integrating the interpolated acceleration.

3. The shake amount detection device of claim 2, wherein the interpolation unit is configured to execute the interpolation by an interpolation curve generated by using three or more accelerations before and after the vibration period.

4. The shake amount detection device of claim 3, wherein the interpolation unit is configured to calculate the interpolation curve by using accelerations before the vibration period, the number of the accelerations being equal to or greater than the number of accelerations after the vibration period.

5. The shake amount detection device of claim 2, further comprising a controller configured to control precision of interpolation arithmetic of interpolating the acceleration during the vibration period.

6. The shake amount detection device of claim 5, wherein the controller is configured to control the precision of the interpolation arithmetic in accordance with at least one of an image magnification and a shutter speed.

7. The shake amount detection device of claim 1, wherein the velocity variation estimation unit is configured to determine whether or not to execute estimation of the velocity variation, in accordance with a length of a continuation period of the vibration period, the continuation period being a time from a start of the vibration period detected by the vibration period detector to an end of the vibration period.

8. The shake amount detection device of claim 1, wherein the velocity variation estimation unit includes:
 a first integration unit configured to integrate the acceleration detected by the acceleration sensor;
 an extraction unit configured to extract an acceleration due to vibration based on an operation of a movable component which is different from the body itself, from among accelerations detected by the acceleration sensor; and
 a second integration unit configured to integrate the acceleration extracted by the extraction unit,
 wherein the velocity variation is estimated from a difference between an integration result of the first integration unit and an integration result of the second integration unit.

9. The shake amount detection device of claim 8, wherein the extraction unit includes a high-pass filter having a cutoff frequency which is higher than an upper limit value of frequencies of vibration of the body due to camera shake and is lower than a lower limit value of frequencies of vibration based on the operation of the movable component.

10. The shake amount detection device of claim 1, wherein the velocity is a translational velocity.

11. The shake amount detection device of claim 1, wherein the vibration of the predetermined threshold or more is vibration due to movement of a shutter.

12. An imaging device comprising:
 the shake amount detection device of claim 1; and
 a shutter,
 wherein the vibration period detector is configured to detect the vibration period, based on a control signal of the shutter.

* * * * *